(12) United States Patent  
Huberman et al.

(10) Patent No.: US 8,533,041 B2  
(45) Date of Patent: Sep. 10, 2013

(54) RISK-AND-RETURN BASED ADVERTISEMENT SELECTION AND SCHEDULING

(75) Inventors: Bernardo Huberman, Palo Alto, CA (US); Dennis Matthews Wikinson, Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 798 days.

(21) Appl. No.: 12/286,486

(22) Filed: Sep. 29, 2008

(65) Prior Publication Data

US 2010/0082413 A1    Apr. 1, 2010

(51) Int. Cl.
*G06Q 30/00* (2012.01)

(52) U.S. Cl.
USPC ...................................... 705/14.4; 705/14.43

(58) Field of Classification Search
None
See application file for complete search history.

(56) References Cited

U.S. PATENT DOCUMENTS

| | | | | |
|---|---|---|---|---|
| 5,999,912 | A * | 12/1999 | Wodarz et al. | 705/14.61 |
| 2006/0135233 | A1 * | 6/2006 | Willis et al. | 463/1 |
| 2006/0212350 | A1 * | 9/2006 | Ellis et al. | 705/14 |
| 2008/0065463 | A1 * | 3/2008 | Rosenberg et al. | 705/10 |
| 2008/0195462 | A1 * | 8/2008 | Magdon-Ismail et al. | 705/10 |
| 2009/0006179 | A1 * | 1/2009 | Billingsley et al. | 705/10 |
| 2009/0094108 | A1 * | 4/2009 | Bhandari et al. | 705/14 |
| 2009/0101706 | A1 * | 4/2009 | Boyd | 235/380 |
| 2010/0223127 | A1 * | 9/2010 | Bettez et al. | 705/14.51 |
| 2010/0241509 | A1 * | 9/2010 | Adachi et al. | 705/14.43 |
| 2010/0257053 | A1 * | 10/2010 | Ferber et al. | 705/14.45 |

* cited by examiner

*Primary Examiner* — Matthew T Sittner

(57) ABSTRACT

Method and system embodiments of the present invention employ risk and return estimates in order to select and schedule display of advertisements. One embodiment of the present invention is directed to an advertising system that includes an advertising-selection-and-scheduling component and an information-provision system. The advertising-selection-and-scheduling component selects advertising for inclusion in information provided to users, prepares a schedule based on risk associated with including the selected advertising in the information provided to the users according to the schedule and based on return expected from including the selected advertising in the information provided to the users according to the schedule, and stores the prepared schedule in a computer-readable medium for subsequent access by the information-provision system.

18 Claims, 19 Drawing Sheets

| name | name | p |
|---|---|---|
| $P_1$ | $P_2$ | .7 |
| $P_1$ | $P_3$ | .5 |
| $P_1$ | $P_3$ | .3 | correlations 1104

| name | $\frac{avg}{t}$ | $\sigma$ |
|---|---|---|
| $P_1$ | 30 | 25 |
| $P_2$ | 10 | 10 |
| $P_3$ | 60 | 50 | partitions 1102

Figure 11

RISK-AND-RETURN BASED ADVERTISEMENT SELECTION AND SCHEDULING

TECHNICAL FIELD

The present invention is related to automated and semi-automated advertising and, in particular, to a method and system for selecting items for display and for scheduling display of the selected items.

BACKGROUND OF THE INVENTION

Although the present invention is applicable to many different types of information provision, including advertising of products and services, providing order information and features for ordering products and services, providing information concerning events and opportunities, and provision of information of general or personal interest to intended recipients, the present invention is discussed, below, in the context of advertisements added to web pages displayed to users over the Internet, a context in which the present invention finds particular utility and applicability. When, for example, a web page describing a selected item is displayed to a user or customer who has requested information about that item, it may be possible to include in the web page references to additional items that may be of interest to the user. References may be descriptive material related to the additional items of interest, including images, summaries, and/or annotations, and may also be or include links to other web pages that describe the additional items of interest. Selecting and adding the references to the items may be an important marketing and advertising effort undertaken by an Internet retailer. Effective displays of items for purchase promote increased sales and revenues as well as additionally providing timely and useful information to browsers and purchasers of items from Internet-based shopping sites and catalogs, even when the users and customers do not immediately choose to purchase the items. Therefore, designers and vendors of web-page-based retailing sites and catalogs, Internet retailers, and, ultimately, customers of Internet retailers have all recognized that continued research and development efforts should be applied to advertising methods and systems.

SUMMARY OF THE INVENTION

Method and system embodiments of the present invention employ risk and return estimates in order to select and schedule display of advertisements. One embodiment of the present invention is directed to an advertising system that includes an advertising-selection-and-scheduling component and an information-provision system. The advertising-selection-and-scheduling component executes on a computer processor, selects advertising for inclusion in information provided to users, prepares a schedule based on risk associated with including the selected advertising in the information provided to the users according to the schedule and based on return expected from including the selected advertising in the information provided to the users according to the schedule, and stores the prepared schedule in a computer-readable medium for subsequent access by the information-provision system. The information-provision system accesses the stored schedule to select advertising for inclusion in the information, and provides the information, including advertising selected according to the schedule, to users for display.

BRIEF DESCRIPTION OF THE DRAWINGS

FIG. 11 shows hypothetical statistical data for a set of three k-partitions according to embodiments of the present invention.

DETAILED DESCRIPTION OF THE INVENTION

The present invention is related to selecting items for display in advertisements and for scheduling display of the selected items. Items may be textual or graphical information, representations of products or services available for purchase or access, information about opportunities, events, and information deemed to be useful or desired by various intended recipients. The word "advertisement" refers, in this document, not only to information related to retailing of products and services, but also to any type of general or specific information that is provided to one or more users of an information-provision system. Embodiments of the present invention are discussed, below, in the context of adding summaries of, images of, and/or links to, items on web pages in order to stimulate sales as well as provide useful information to purchasers and browsers. Provision of information to users provides for display of the information to a user, including displaying the information on a computer screen through a web browser, printing the information on a physical medium that can be read or accessed by the user, and other means for providing the information in a useable form to users. The context for the following description of embodiments of the present invention is Internet-based retailing in which short description, small images, and/or links describing items for purchase are included on web pages that are returned by an Internet retailer to customers of the Internet retailer for display on the display screen of the customer's computer. However, it should be appreciated that alternative method and system embodiments of the present invention may provide for selection of items for display, and scheduling display of the selected items, in a variety of different communications media and information-provision environments. The methods and systems to which the current application is directed involve computing schedules on computer systems or other computational engines and storing results in computer memories, on mass-storage devices, or in other permanent or semi-permanent electronic data-storage devices or physical media.

Figure 1:
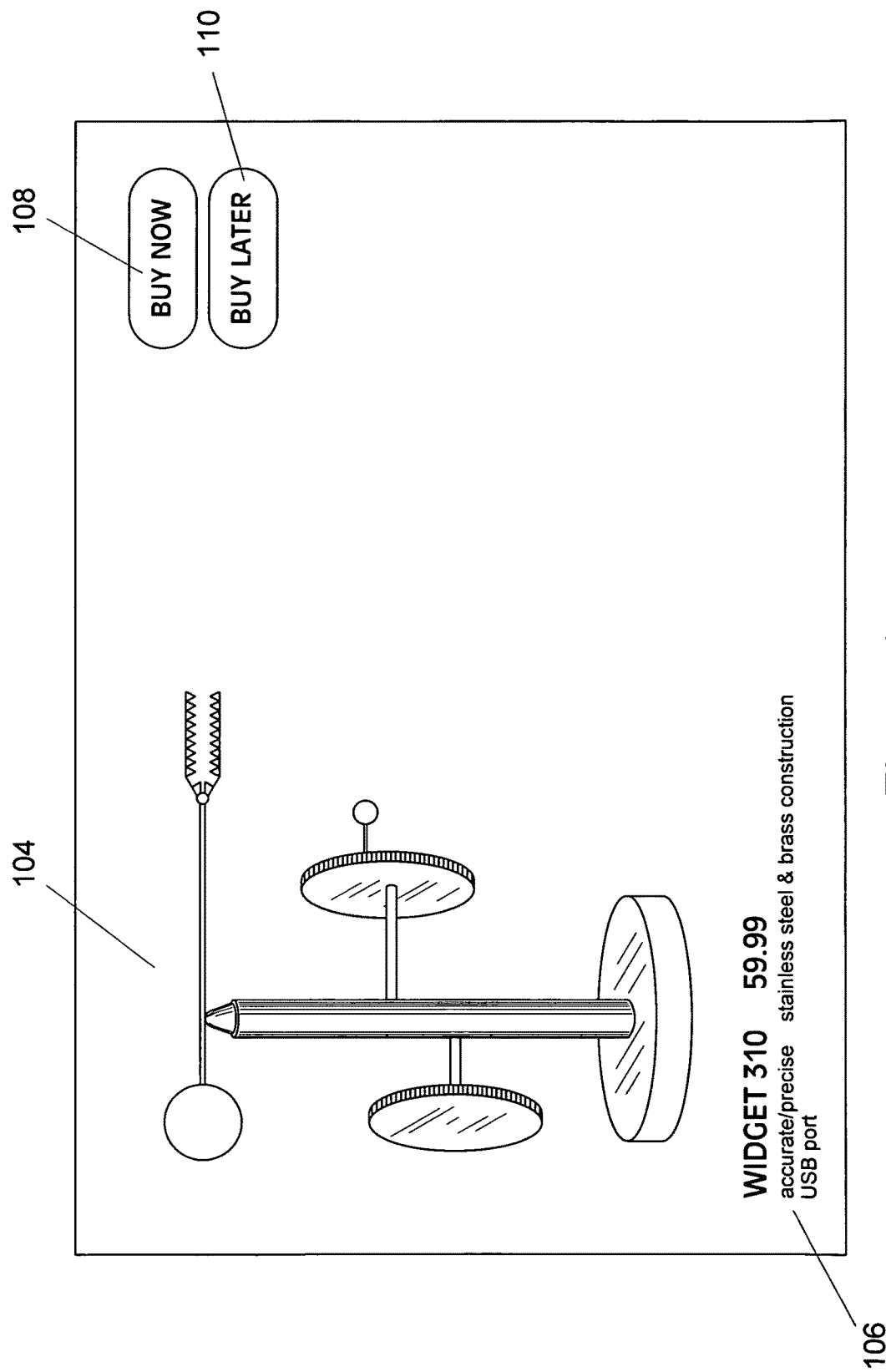
FIG. 1 shows an exemplary web page that may be provided by an Internet retailer to a customer via the Internet, the customer's personal computer, and a web browser executing on the personal computer.

FIG. 1 shows an exemplary web page that may be provided by an Internet retailer to a customer via the Internet, the customer's personal computer, and a web browser executing on the personal computer. The customer may have browsed through a catalog of items for display and selected a particular item via input to a web-page input feature, in response to which the Internet retailer's web-page server has provided the web page shown in FIG. 1. The web page includes an image of the item that is available for purchase 104, alphanumeric information concerning the item 106, and features 108 and 110 that allow a user to initiate purchase or defer purchase of the item. There are many different possible approaches for furnishing such information, including many different possible web-page layouts, and the method and system embodiments of the present information can add advertising to item-display web pages, such as that shown in FIG. 1, or to any of many other types of information for display to users and customers, including product descriptions, descriptions of services, general information regarding products and services, and many other types of information.

Figure 2:
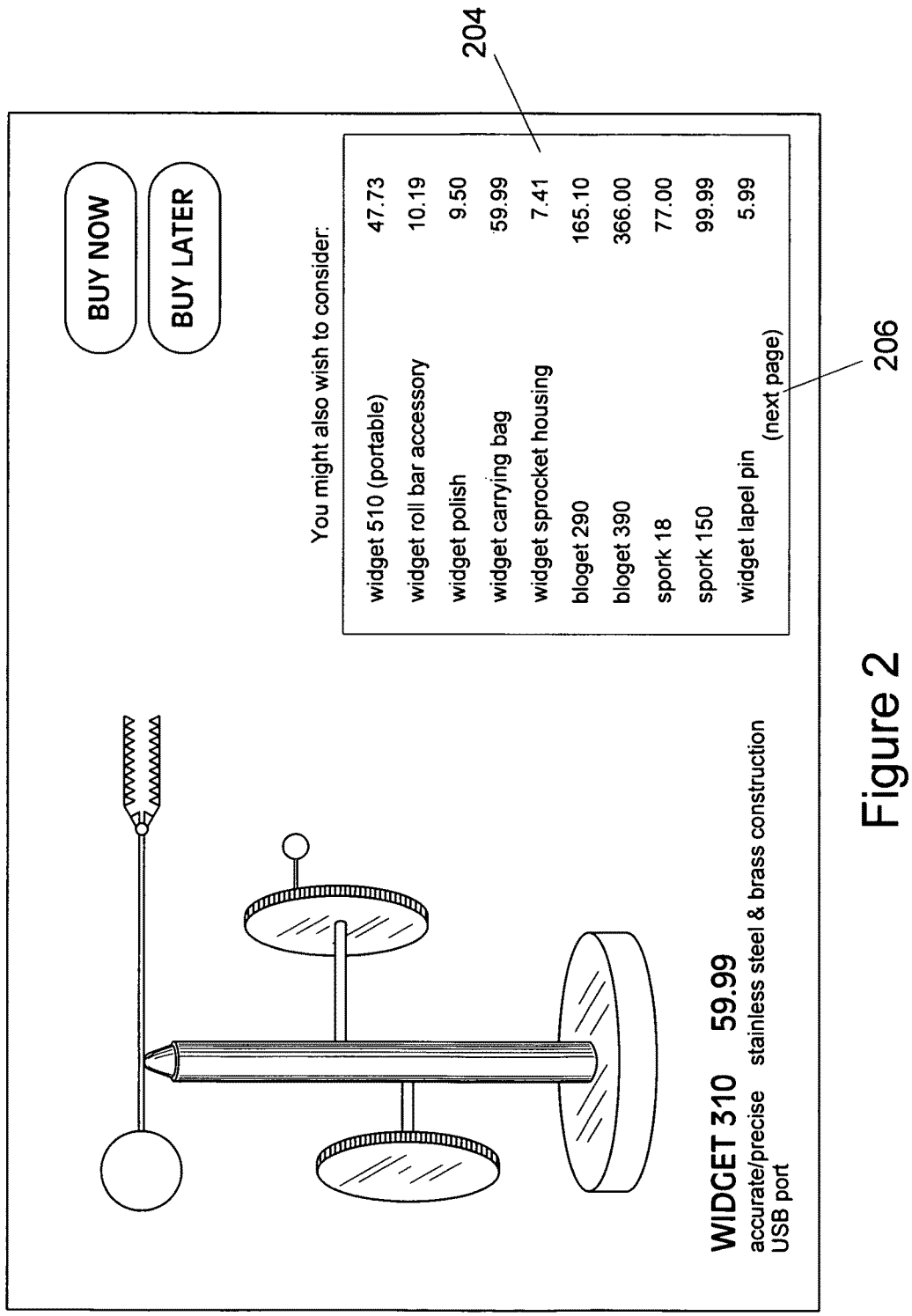
FIG. 2 shows the web page of FIG. 1 supplemented with a list of hyperlinks to items available for purchase.

The exemplary web page shown in FIG. 1 contains a relatively large blank display area, or available web-page real estate. An Internet retailer may wish to better utilize this available web-page real estate by including descriptions and/or pictures of, and/or hyperlinks to, additional items available for purchase in order to facilitate users' browsing and to encourage users to purchase items. FIG. 2 shows the web page of FIG. 1 supplemented with a list of hyperlinks to items available for purchase. The list 204 ends with a hyperlink 206 to one or more additional pages of hyperlinks that describe items for purchase. Internet retailers have learned, through extensive marketing and advertising research, that filling a web page with references to items is quite often ineffective and even counterproductive with respect to the goal of encouraging additional purchases and facilitating browsing. Often, users and customers are overwhelmed by large amounts of additional information, and tend to ignore all of the additional links rather than spending time to read and consider even a few of the additional links.

Figure 3:
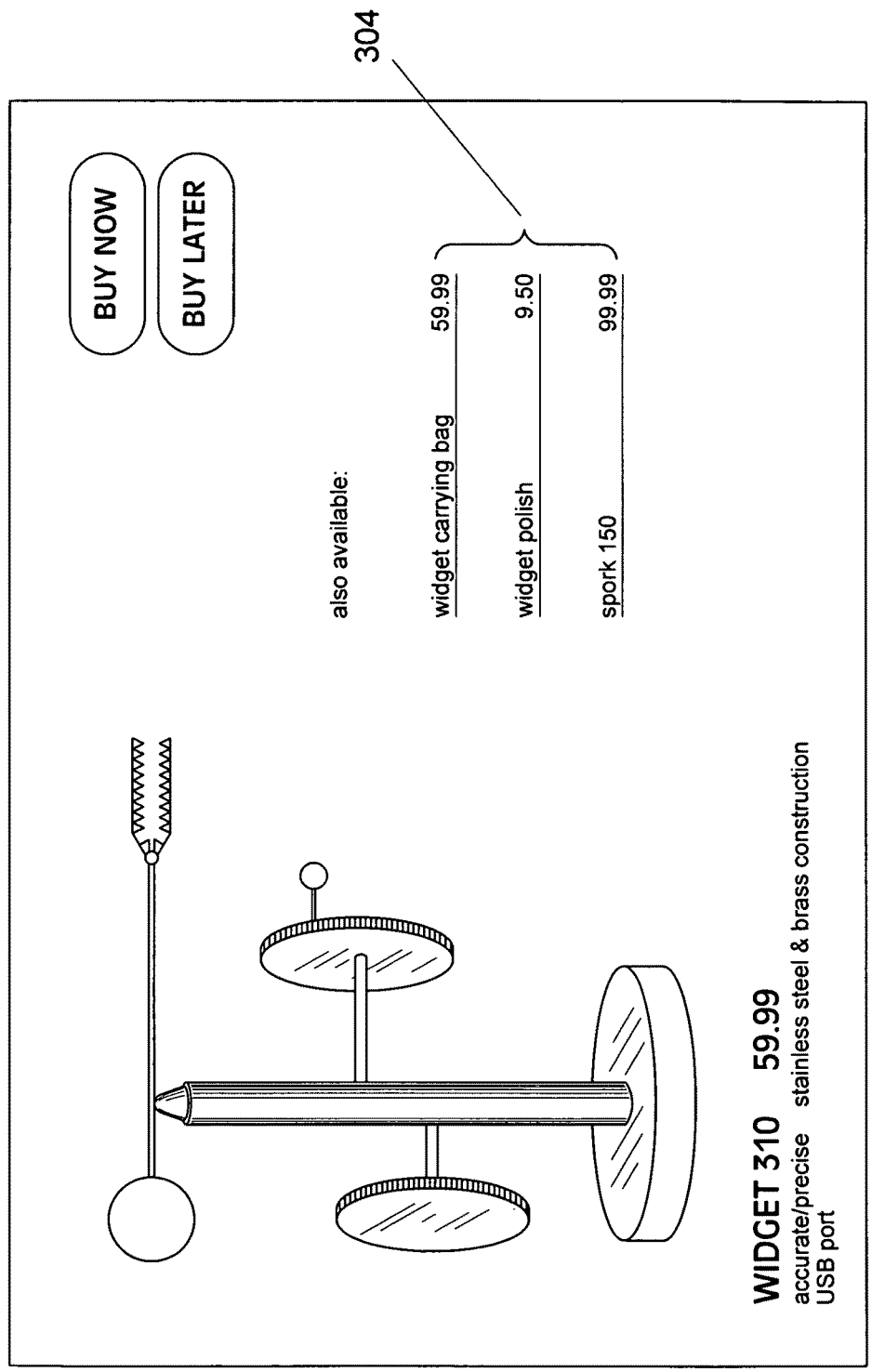
FIG. 3 illustrates an effective approach to including descriptions and images of, and/or links to, items for purchase within a web page.

Rather than filling web pages, such as the web page shown in FIG. 1, with references to items available for purchase, Internet retailers and other advertisers have found that including only a few references to a few items available for purchase is most effective in attracting a customer's attention to the availability of the items. FIG. 3 illustrates an effective approach to including descriptions and images of, and/or links to, items for purchase within a web page. As shown in FIG. 3, hyperlinks to only three items 304 have been included in the web page. Display of a relatively small number of items is a far more effective approach to attracting a potential purchasers' attention and inducing the potential purchasers to seek additional information about the items.

Although it has been established that displaying only a few items within a single web page is a more effective approach to promoting additional browsing and, ultimately, additional sales, as discussed above with reference to FIGS. 1-3, this more effective approach generates an additional set of problems that need to be considered and solved by Internet retailers. Comparing the list of items displayed in FIG. 3 to the list of items displayed in FIG. 2, it is apparent that the three items for which links are provided in the web page shown in FIG. 3 have been selected from a much larger list of candidate items that may be displayed to a user or customer. Determining how to optimize the selection of the few items from a large list of potential candidate items in order to optimize the rate of additional purchases is one problem or consideration that needs to be addressed. Determining a schedule for displaying different sets of selected items represents yet another problem, or consideration, that needs to be addressed. For example, it is likely the case that, by varying the items displayed on web pages, such as the web page shown in FIG. 3, an Internet retailer is more likely to promote additional sales than by simply selecting a fixed, small set of items and displaying those items for an extended period of time. As one example, were a user to access a particular web page multiple times during a time interval, and were the Internet retailer to display to the user a different set of items each time the web page is accessed by the user, it would intuitively seem more likely that the Internet retailer will end up displaying one or more items of interest to the user. However, it may also be the case that a user or customer only notices an item after multiple displays. These problems, and additional problems and considerations related to the display of items available for purchase, are addressed by method and system embodiments of the present invention.

In certain cases, there may be closed-form, analytical expressions for expected purchase activity for each candidate item for display on a web page, such as the web page discussed with reference to FIGS. 1-3. In such cases, it may be possible to employ deterministic and computationally efficient optimization techniques in order to optimally select items for display and to optimally schedule display of the selected items in order to generate the greatest additional sales or greatest additional revenue for an Internet retailer. However, in most cases, such closed-form solutions are not available, and the amount of effort that would be required to even attempt to find them far exceeds the benefits in additional revenue and sales that might be reasonably anticipated to accrue from the effort. Method and system embodiments of the present invention are directed to more practical approaches.

Figure 4:
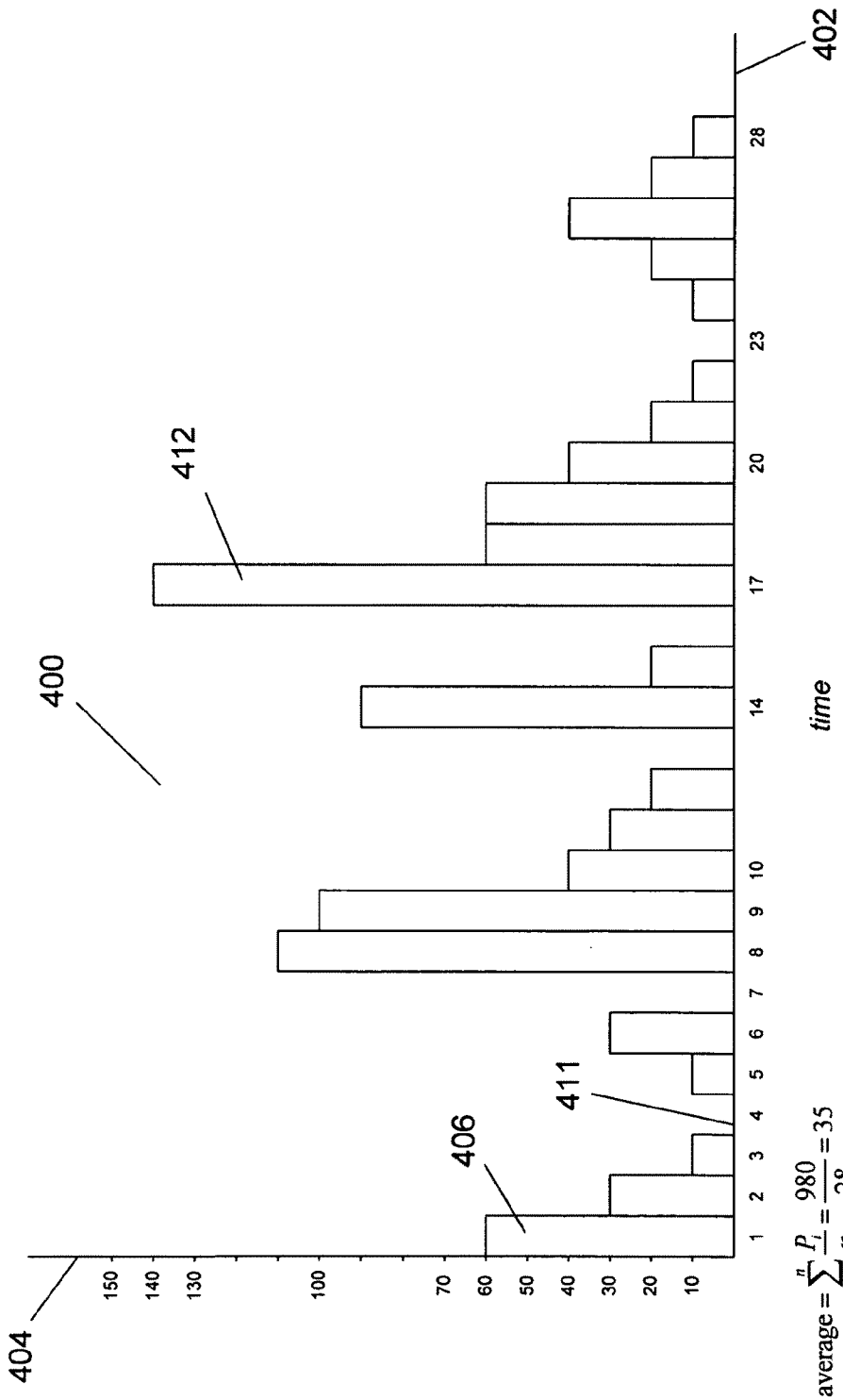
FIG. 4 illustrates an exemplary histogram representing a record of sales or purchases for a first item.

One familiar type of information that may be continuously collected and compiled for each item sold by an Internet retailer is a histogram of purchases or sales over some period of time. FIG. 4 illustrates an exemplary histogram representing a record of sales or purchases for a first item. Time is plotted with respect to the horizontal axis 402 of the histogram 400 and the number of sales or purchases of the item during each fixed-length interval of time is plotted with respect to the vertical axis 404. The fixed length of time intervals for which purchases are summed may vary from seconds to hours, days, months, or even longer periods of time. For the purpose of describing the present invention, the length and units of these fixed intervals is irrelevant. Each vertical bar, or column, in the histogram represents the number of sales or purchases of an item during a time interval represented by the width of the vertical bar. For the item for which the purchase or sales record is shown in FIG. 4, the vertical bar 406 indicates that 60 items were purchased or sold during a first time interval.

Were a continuous curve fitted to the heights of the vertical bars, in the histogram shown in FIG. 4, a continuous-function approximation to the discrete points in the histogram would be obtained. However, this continuous-function approximation would, in general, appear to be erratic, at least over short time scales, and would generally not be periodic, constant, or otherwise regularly varying. It would be difficult or impossible to find a simple closed-form expression for the continuous-function approximation. However, there are well-known statistical methods for characterizing histograms, such as the histogram shown in FIG. 4. Three statistical parameters that can be easily computed include: (1) the average number of purchases or sales per interval of time; (2) the variance in the purchases or sales over the time period; and (3) the standard deviation for the purchases or sales over the time period. These statistical quantities are computed or estimated as:

$$\text{average}/\delta t = \frac{\sum_{i=1}^{n} H_i}{n} = \overline{H}$$

$$\text{variance} = \frac{\sum_{i=1}^{n}(H_i - \overline{H})^2}{n-1} = \sigma^2$$

$$\text{standard deviation} = \sqrt{\sigma^2} = \sigma$$

where
n=number of time intervals; and
$H_i$=number of purchases during time interval i.

The notation "average/δt" is used to indicate that an average rate of sales or purchases is obtained.

Figure 5:
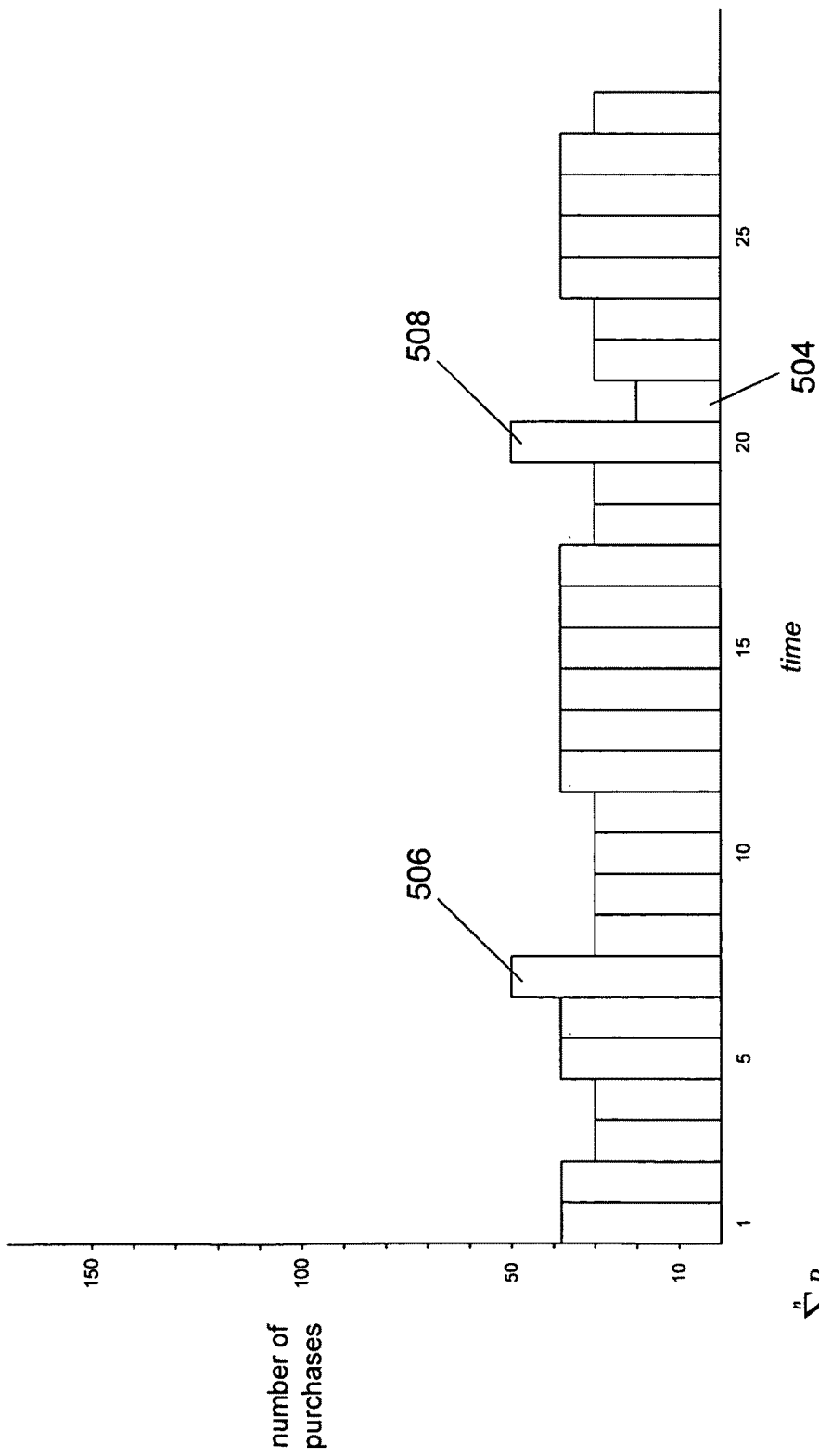
FIG. 5 illustrates an exemplary histogram representing a record of sales or purchases for a second item.

FIG. 5 illustrates an exemplary histogram representing a record of sales or purchases for a second item. Notice that, in comparison with the historical purchase or sales data shown in FIG. 4 for the first item, the purchase or sales activity for the second item, shown in FIG. 5, indicates that the second item is purchased with more regularity than the first item. As can be seen in the histogram shown in FIG. 4, in any given interval of time, purchases of the first item may vary from no purchases, represented by the lack of a vertical bar 411 for the fourth time interval all the way up to 140 purchases, represented by vertical bar 412. By contrast, the item for which the purchase or sales history is shown in FIG. 5 is purchased, during any particular time interval, at a rate of between 20 purchases per time interval, represented by histogram bar 504, and 50 purchases per time interval, represented by histogram bars 506 and 508. When considered over the entire time period, the average purchase rate for the first item, the history of purchases for which is shown in FIG. 4, turns out to be 35 purchases per time interval, while the average purchase rate for the second item, the purchase history of which is shown in FIG. 5, works out to be 36 items per time interval. Thus, the average rate of sales for both items is nearly identical. However, the variance and standard deviation for purchase of the first item, 815.5 and 28.56, respectively, are significantly higher than the variance and standard deviation computed for the second item, 47 and 6.86, respectively. Thus, it is readily seen, comparing FIGS. 4 and 5, that the regularity of purchase or sales rates for an item is reflected by the variance and standard deviation computed from the purchase or sales history of the item, with regularity inversely related to variance and standard deviation.

Figure 6:
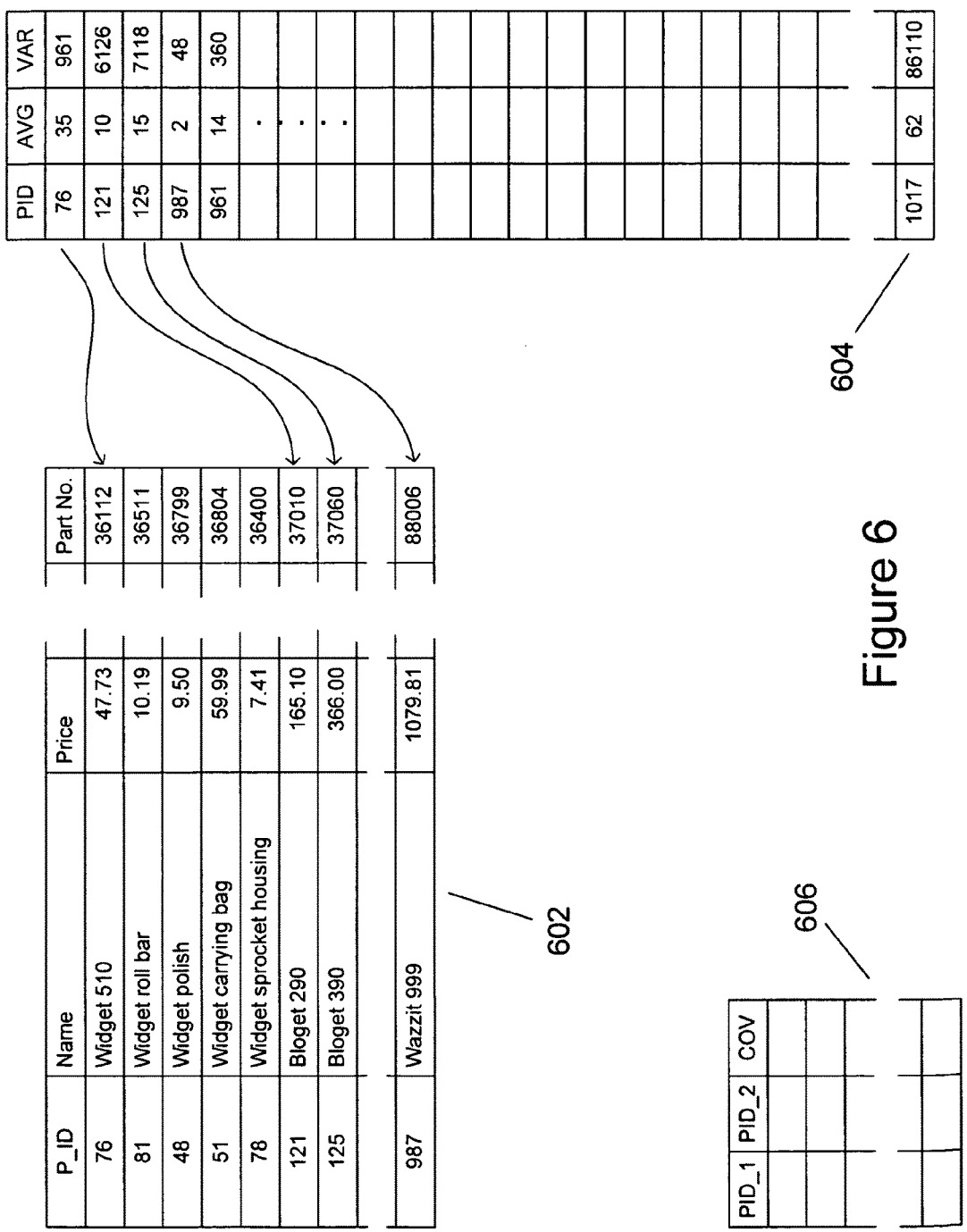
FIG. 6 illustrates the data that is assumed to be available for candidate items for display on a particular web page according to embodiments of the present invention.

FIG. 6 illustrates the data that is assumed to be available for candidate items for display on a particular web page according to embodiments of the present invention. Note that the candidate items for display may be selected from some much larger set of items on the basis of the relatedness of the candidate items to the information included in the web page into which the items are displayed. However, in other cases, the list of candidate items for display may include either a random selection from a larger set of items or it may include all of the items that may be sold by a particular Internet retailer. Each item may be described by a row in an items table 602. The items table may include columns, or fields, such as an item ID, or product ID, the alphanumeric name of the item, a numeric price for the item, and other such information. A current item-statistics table 604 may include the currently computed average sales rate per time interval and the variance of the sales for each item. Note that table 604 in FIG. 6 includes a product identifier column, with the product identifier in each row of the table referencing a row describing the product in table 602. Additionally, in certain cases, a covariance or correlation coefficient for each possible pair of items may be included in an additional table 606. Note also that, by "variance," one may refer to the statistical variance $\sigma^2$ or the standard deviation $\sigma=\sqrt{\sigma^2}$. Both are measures of variance.

Figure 7:
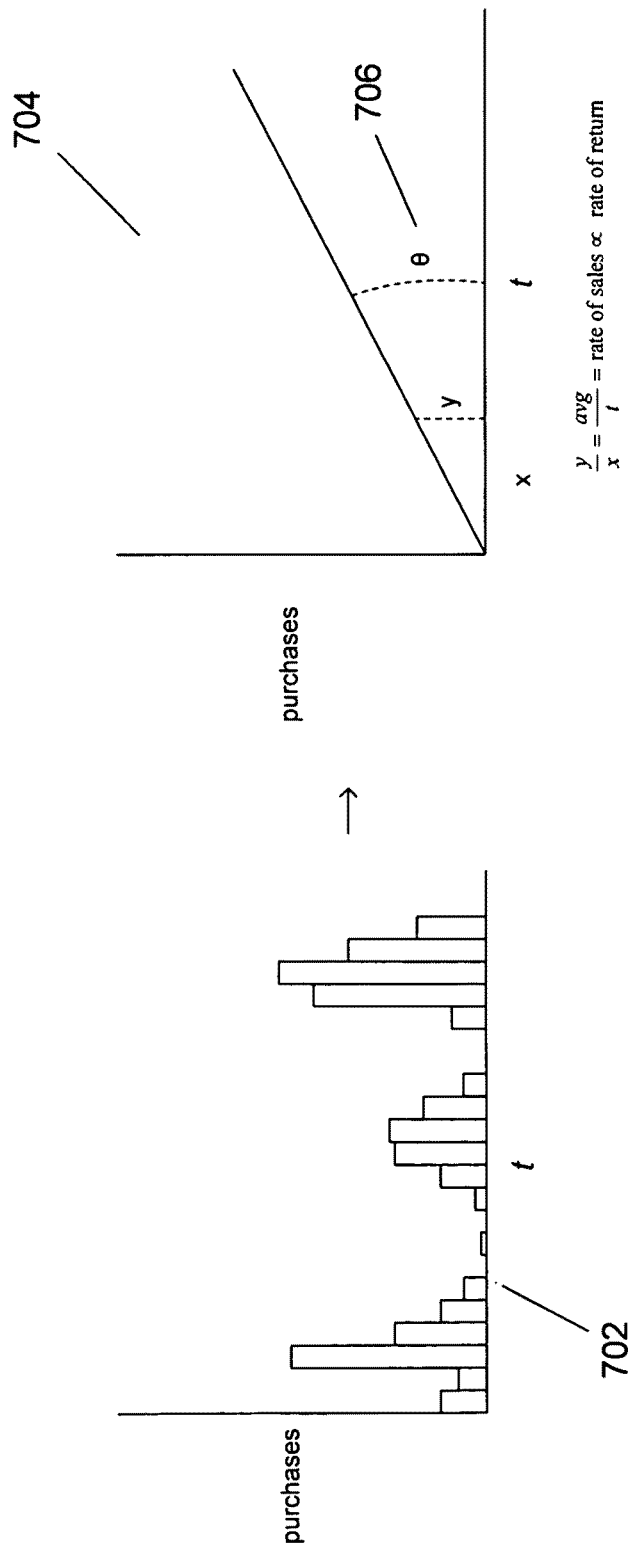
FIG. 7 illustrates a simple statistics-based estimation of return according to embodiments of the present invention.

FIG. 7 illustrates a simple statistics-based estimation of return according to embodiments of the present invention. The term "return" may mean number of sales within a period of time or revenue generated from sales over a period of time. As shown in FIG. 7, a sales-history or purchase-history histogram 702 can be essentially turned into a linear return function 704 using the average purchase rate or sales rate computed from the histogram. An estimated return can be computed as:

$$\text{return} = A\left(\frac{avg}{\delta t}\right)t$$

where A is a constant. In following discussion, this constant may be omitted. The estimated return function is essentially a linear function where the average rate of return, or statistical average, computed for the histogram is the slope 706 of the linear function. Thus, by advertising an item for a period of time t, $$t\left(\frac{avg}{\delta t}\right)$$

purchases will be estimated to occur or, equivalently, $$tA\left(\frac{avg}{\delta t}\right)$$

revenues will be generated, where A is the revenue per purchase of the item.

Figure 8:
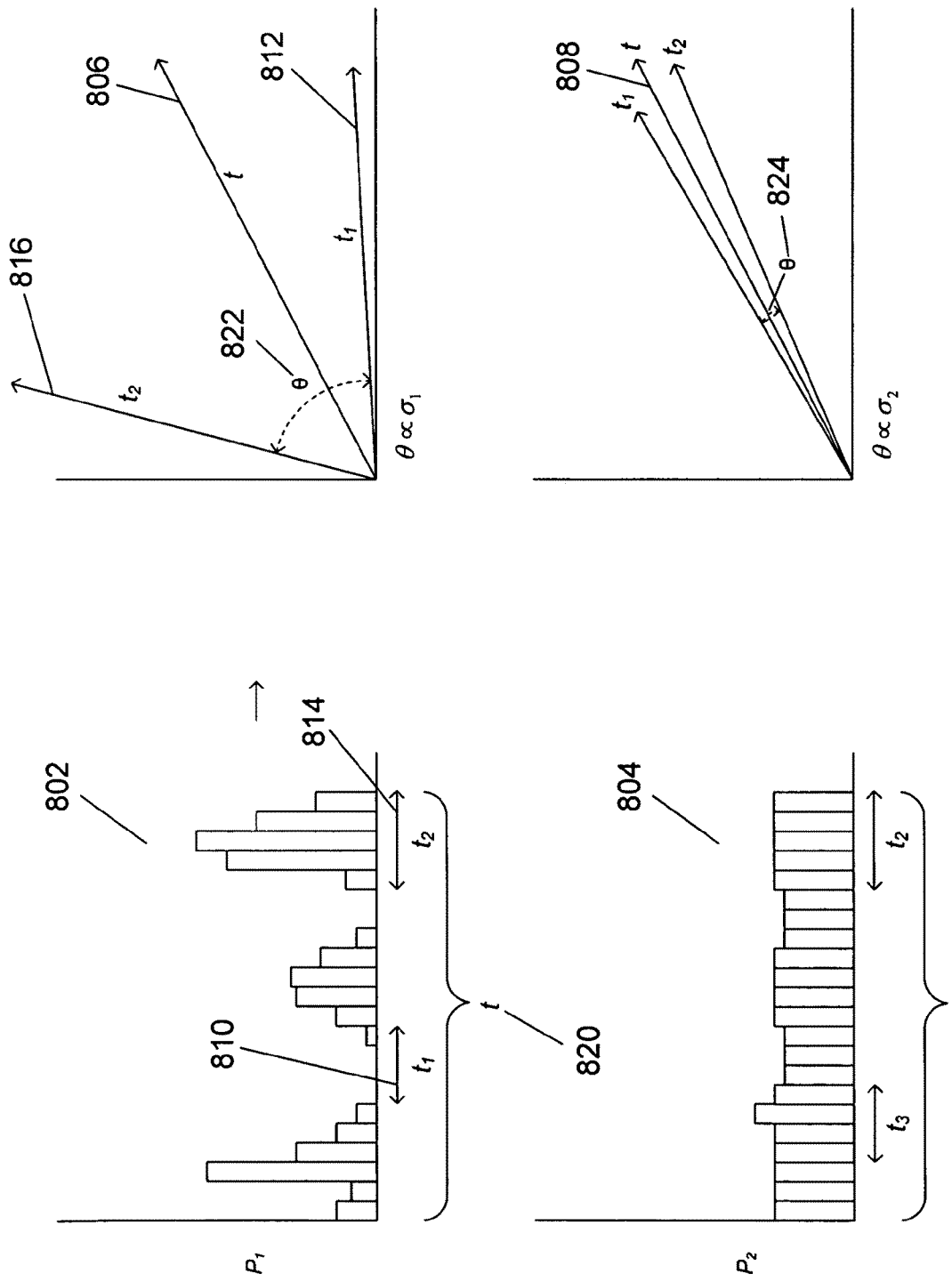
FIG. 8 illustrates the risk associated with estimated return functions according to embodiments of the present invention.

The risk associated with advertising an item can be computed as a function of the statistical variance of the purchase rate $\sigma^2$ or the standard deviation, $\sigma$. The risk reflects an uncertainty in the estimated return function. FIG. 8 illustrates the risk associated with estimated return functions according to embodiments of the present invention. FIG. 8 shows a first histogram 802 representing the purchase history for a first item and a second histogram 804 representing the purchase history for a second item. The estimated return functions 806 and 808, to the right of the histograms, are the linear estimated return functions obtained using the average purchase rates or sales rates computed from the histograms. In the case of the first histogram, were the sales rate estimated from the sales during time interval $t_1$ 810, the average sales rate would be extremely small, and would result in a return function 812 with a very small slope. Similarly, if the sales rate or purchase rate were estimated over time interval $t_2$ 814, then a very high sales or purchase rate would be estimated, producing the estimated return function 816. Again, when estimated over the entire time interval t 820, the return function 806 is obtained. The range of slopes of the different estimated linear return functions that can be obtained using different time intervals, θ822, is related to the standard deviation σ computed from the sales or purchase record, represented by histogram 802. Thus, a histogram with a large computed variance, such as histogram 802 in FIG. 8, produces a wide potential variation in estimated sales or purchase rates, and therefore a wide possible range of slopes of estimated linear return functions obtained from average sales rates or purchase rates estimated over different time intervals. By contrast, a relatively regular and stable sales history, such as that represented by histogram 804, results in a very narrow range 824 of possible estimated-return-function slopes. The above discussion, of course, assumes that the various intervals of time are of sufficient length to provide statistically meaningful rate estimates. Were very small time intervals used, the variation would generally be much higher, and much less meaningful, The standard deviation is therefore related to the risk in incorrectly estimating a local, particular sales rate or purchase rate for an item based on cumulative statistics computed from a histogram over a large interval of time. Another way of looking at this risk is that, were one to estimate the return function for histogram 802 as the return function 806 computed from the average purchase or sales rates for the first item over the full time interval 820, then were one to use this function to estimate the sales rate for the first item over some shorter period of time, such as time interval $t_1$ 810 or time interval $t_2$ 814, it is likely that the estimate based on return function 806 would be quite different from the actual purchase or sales rate observed. By contrast, the estimate for a short time period based on return function 808 for the second item would likely be nearly correct, regardless of the subinterval for which the estimate is made.

In the case of advertising items on a web page, displaying a link for an item associated with a high variance represents a greater risk than displaying a link for an item associated with a low variance. For the item displayed during a time interval in which the purchase or sales rate happens to be high, a large net return would be expected, but if displayed during a time when the local purchase rate or sales rate is low, the expected return would correspondingly be low.

The covariance for two random variables X and Y is given by:

$$cov(X,Y) = E((X-\mu)(Y-\nu))$$

where $\mu = E(x)$ = expected value of X, estimated as the average value of X; and $\nu = E(Y)$ = average value of Y, estimated as the average value of Y.

The covariance is related to the correlation between the values of the independent variables X and Y. Covariance can also be expressed:

$$cov(X,Y) = P_{X,Y}\sigma_x\sigma_y$$

where $$P_{X,Y} = \frac{cov(X,Y)}{\sigma_x\sigma_y} = \text{correlation coefficient}$$

The correlation coefficient $P_{X,Y}$ ranges in value from 0.0 to 1.0, and provides a numeric indication of the degree of dependence, or relatedness, of the two random variables, with the value 0.0 indicating independence and the value 1.0 indicating complete dependence. The variance for a sum of random-variable values, $X_1 + X_2 + \ldots + X_n$, is given by:

$$\text{Var}\left(\sum_{i=1}^{n} X_i\right) = \sum_{i=1}^{n} \text{var}(X_i) + 2\sum_{i=1}^{n}\sum_{j=i+1}^{n} \text{cov}(X_i, X_j) = \sigma^2$$

and the variance for a sum of random-variable values, $a_1X_1 + a_2X_2 + \ldots + a_nX_n$, is given by:

$$\text{Var}\left(\sum_{i=1}^{n} a_i X_i\right) = \sum_{i=1}^{n} a_i^2 \text{var}(X_i) + 2\sum_{i=1}^{n}\sum_{j=i+1}^{n} a_i a_j \text{cov}(X_i, X_j) = \sigma^2$$

Figure 9:
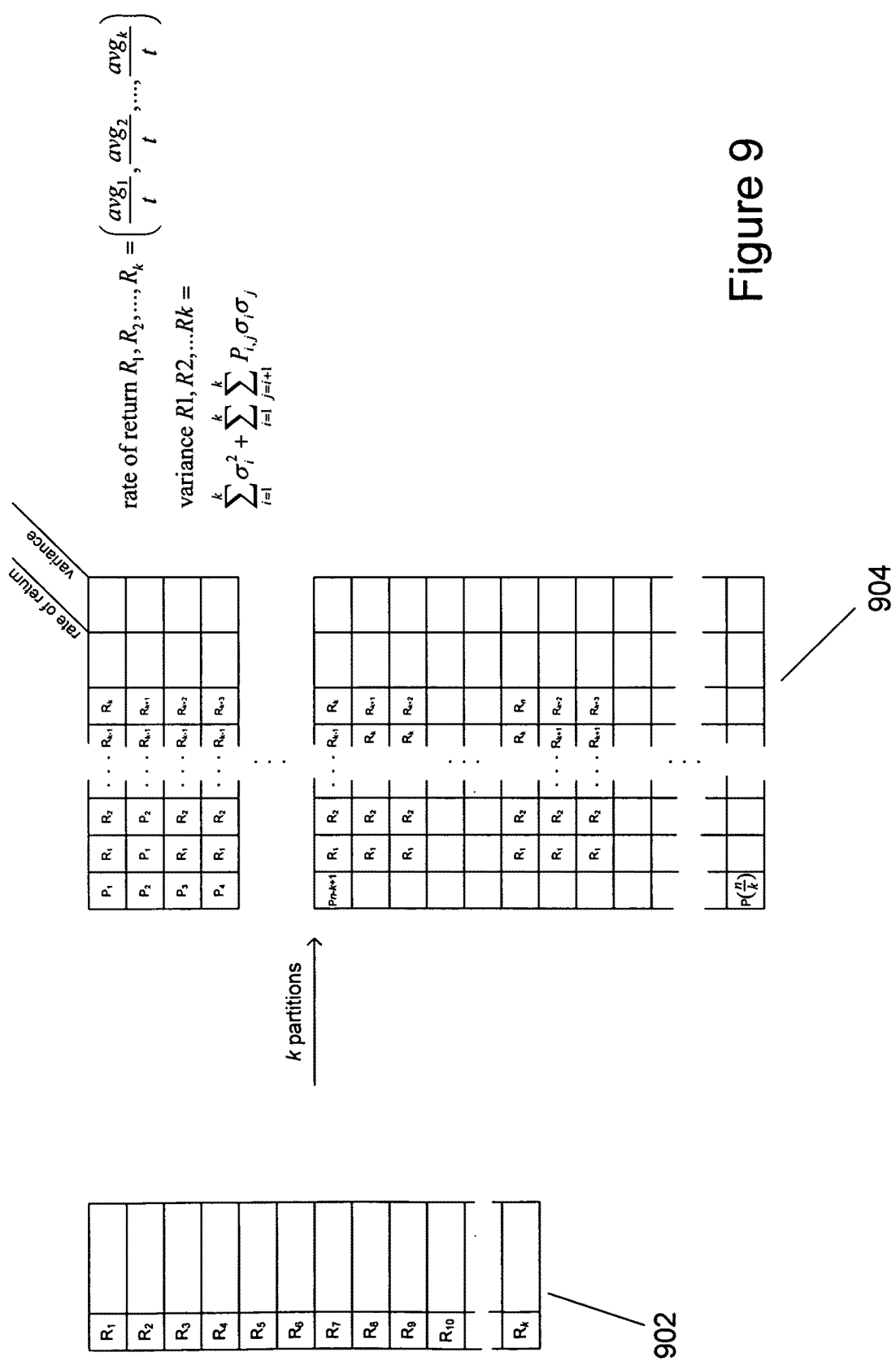
FIG. 9 illustrates creation of a list of k-partitions from a list of candidate items for display according to embodiments of the present invention.

A first step in determining a selection and schedule for display of items, according to certain embodiments of the present invention, is to determine the number k of items to display at any given instance in a time in a particular web page. In the example shown in FIG. 3, k=3. Once a determination of k is made, the total list of candidate items can be transformed into a list of k-partitions of those items. FIG. 9 illustrates creation of a list of k-partitions from a list of candidate items for display according to embodiments of the present invention. The total list of candidate items for display 902 can be used as a basis for computing all possible combinations of k items selected from the list of candidate items 902. The list of all possible k-partitions 904 represents the list of all possible sets of k items for additional display in a web page. When k is small, one can deterministically compute all possible k-partitions. However, since the number of k-partitions is $$\binom{n}{k} = \frac{n!}{k!(n-k)!},$$

it is computationally infeasible to compute all possible k-partitions for larger values of k. In the latter case, a random or deterministic selection of a set of m k-partitions from the set of all possible k-partitions can be made. The candidate items 902 may be ordered by a metric, such as the ratio of average return rate to risk, and m k-partitions may then be selected from all possible k-partitions of a number of candidate items with largest metric values. Alternatively, one can simply randomly generate m k-partitions. Thus, however accomplished, a second step of the process that represents one embodiment of the present invention produces a list of m k-partitions 904. Please note that, in certain cases, k may be equal to one, when there is room for display of only a single reference within a web page or document, or when it is found that k=1 is the optimal k for an advertising effort.

The rate of return and standard deviation for each of the k-partitions can be computed as:

$$\text{rate of return} = \left(\frac{avg}{\delta t}\right)_1 + \left(\frac{avg}{\delta t}\right)_2 + \ldots + \left(\frac{avg}{\delta t}\right)_k$$

$$\text{standard deviation} = \left(\sum_{i=1}^{k}\sigma_i^2 + 2\sum_{i=1}^{k}\sum_{j=i+1}^{k}P_{i,j}\sigma_i\sigma_i\right)^{1/2}$$

Thus, each of the m k-partitions represents a different set of items to be displayed on a web page, and each k partition is associated with average estimated rate of purchases, sales, or revenue and a standard deviation.

In a next step, the fraction of some time interval, $f_1$, $f_2$, ..., $f_n$, or the amount of times, $t_1, t_2, ..., t_m$, for which each of the different possible k-partitions should be displayed over some longer time interval is computed. Given that $t_1, t_2, ..., t_m$ represent the total amount of time that the partitions $P_1$, $P_2$, ..., $P_m$ are displayed within some longer of time period, and $f_1, f_2, ..., f_n$ are the fractions of a period of time for display of each of the k-partitions, the total return and risk for any given set of times $t_1, t_2, ..., t_n$ or fractions $f_1, f_2, ..., f_m$, are given by:

$$\text{return} = t_1\frac{avg_1}{t} + t_2\frac{avg_2}{t} + \ldots + t_m\frac{avg_m}{t}$$

$$= (f_1 avg_1, f_2 avg_2 + \ldots + f_m avg_m)t$$

$$\text{risk} = \left(\sum_{i=1}^{m}t_i^2\sigma_i^2 + 2\sum_{i=1}^{m}\sum_{j=i+1}^{m}t_it_jP_{i,j}\sigma_i\sigma_j\right)^{1/2}$$

$$= t\left(\sum_{i=1}^{m}f_1^2\sigma_i^2 + 2\sum_{i=1}^{m}\sum_{j=i+1}^{m}f_if_jP_{i,j}\sigma_i\sigma_j\right)^{1/2}$$

Computing optimal values for $f_1, f_2, ..., f_m$ is a traditional optimization problem. An objective function $f(\ )$ can first be determined, such as:

$f(\ )$=return/risk; or $f(\ )$=return at points $f_1, f_2, ..., f_m$ in fractional-display-time space where risk <=threshold Determining a best set of fractional display times for each k partition is then an optimization problem in which a set of fractional-display-time values $f_1, f_2, ..., f_m$ for which the objective function returns a maximal value is determined and returned as an optimal set of fractional-display-times values.

Figure 10:
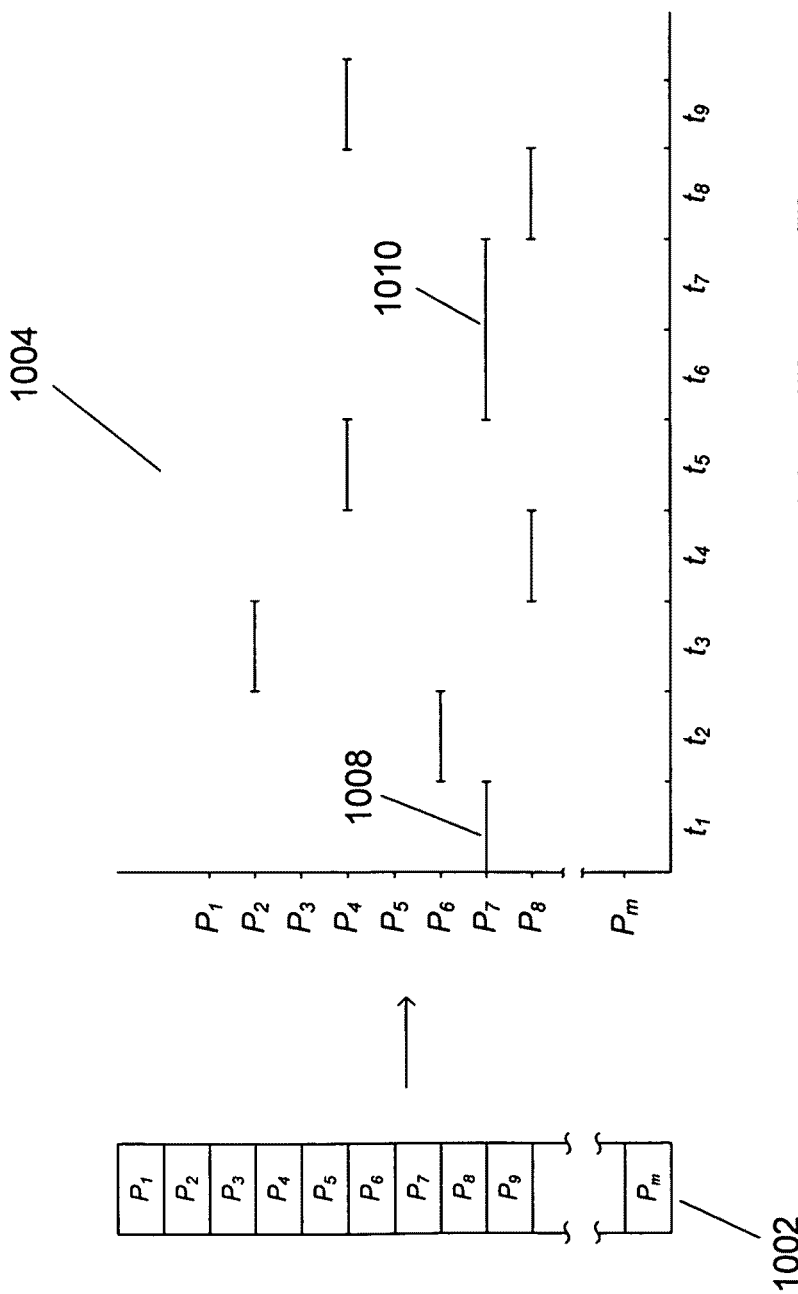
FIG. 10 illustrates a schedule-creation process employed by embodiments of the present invention.

FIG. 10 illustrates a schedule-creation process employed by embodiments of the present invention. Given the set of m k-partitions 1002, and having calculated an optimal set of times or fractional display times for display of each of the k-partitions, a schedule 1004 is created in which one k partition is assigned to each time interval in the period of time during which display of items is undertaken by an Internet retailer. For example, as shown in FIG. 10, the k items in the k partition $P_7$ are displayed during time interval $t_1$ 1008 and during time intervals $t_6$ and $t_7$ 1010 in schedule 1004.

It might, at first, appear reasonable to suggest that one simply evaluate all of the different k-partitions for average rate of return and variance, and select as candidate k-partitions only those partitions with a high rate of return coupled with relatively low variance, or risk. However, use of only such k-partitions may actually produce a non-optimal advertising schedule. It may be the case that, by including k-partitions with very high rates of return as well as high risks, a greater overall rate of return can be achieved than by selecting only those k-partitions with high rates of return coupled with low rates of risk. Similarly, once having settled on a set of m k-partitions, an optimal set of fractional display times of each of the m k-partitions may include significant fractional display times for k-partitions associated with high risk. Thus, optimization, or estimates of optimization, of fractional display times for display of each of the k-partitions can produce a more optimal schedule than simply selecting only those k-partitions with high rates of return coupled with low risk for display.

FIG. 11 shows hypothetical statistical data for a set of three k-partitions according to embodiments of the present invention. The k-partitions are named "$P_1$," "$P_2$," and "$P_3$." A first table 1102 shows the average rate of return and standard deviation for each of the three partitions and the second table 1104 shows the correlation coefficients for each possible pair of partitions. These data are then used to compute an estimated return, variance, and return/risk ratio for possible fractional display times, as shown in FIGS. 12-15.

Figure 12:
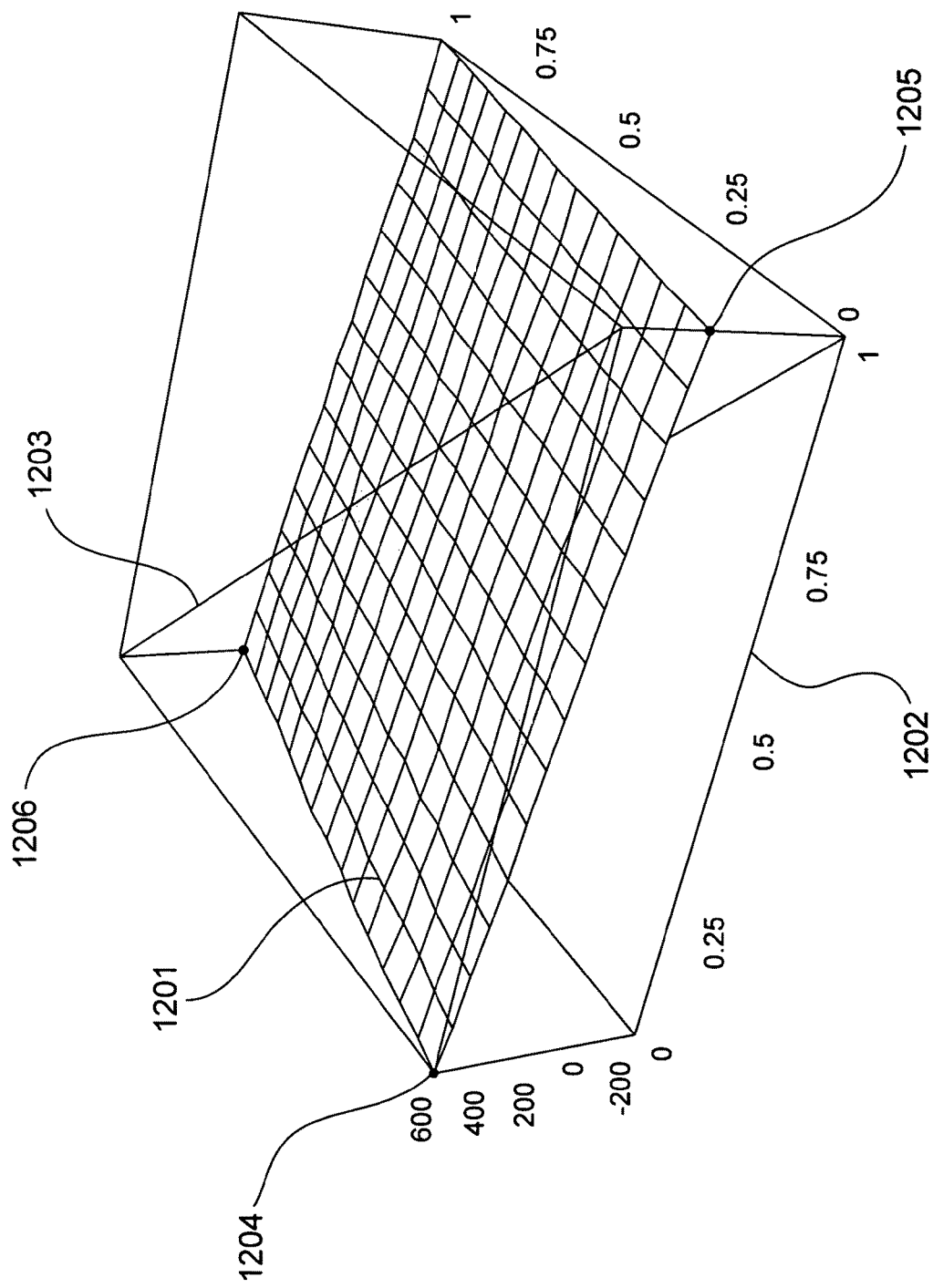
FIG. 12 shows the estimated return computed according to embodiments of the present invention for possible fractional display times for the three k-partitions described by data shown in FIG. 11.

FIG. 12 shows the estimated return computed according to embodiments of the present invention for possible fractional display times for the three k-partitions described by data shown in FIG. 11. In FIG. 12, the relevant portion of the estimated return surface 1201 is that to the left of the diagonal plane 1203 $f_1=f_2$. The return is estimated for displaying items for 10 time units. The x axis 1202 corresponds to the fraction of time that partition $P_1$ is displayed, $f_1$. They axis corresponds to the fraction of time that partition $P_2$ is displayed, $f_2$. The fraction of time for display of partition $P_3$, $f_1$, is $1-f_1-f_2$. When $f_1$ and $f_2$ are 0, and $f_3=1.0$, then 10×60=600 units of items selected from partition 3 are sold, as represented by point 1204. Similarly, when $f_1=1.0$ and $f_2$ and $f_3$ are 0, at point 1205, then 300 items from partition 1 are sold during the 10 time intervals. If $f_2=1.0$ and $f_1$ and $f_3=0$, at point 1206, then 100 items selected from partition $P_2$ are sold in ten time intervals. Thus, to maximize the rate of return, one would display only those items of partition 3 for the entire period of 10 time intervals.

Figure 13:
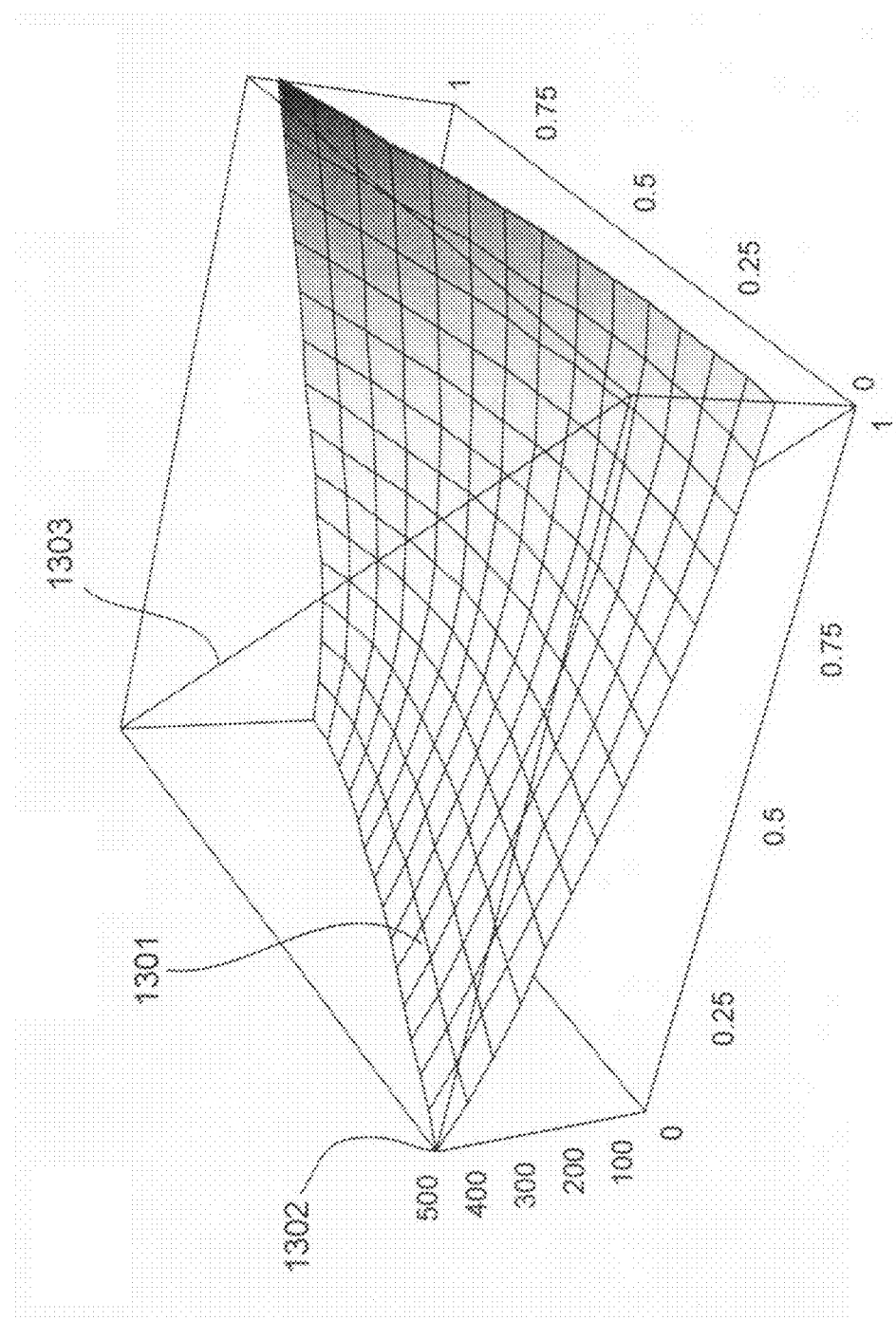
FIG. 13 shows a plot of computed risk versus fractional display times $f_1$ and $f_2$ for the three k-partitions described by data shown in FIG. 11 according to embodiments of the present invention.
Figure 14:
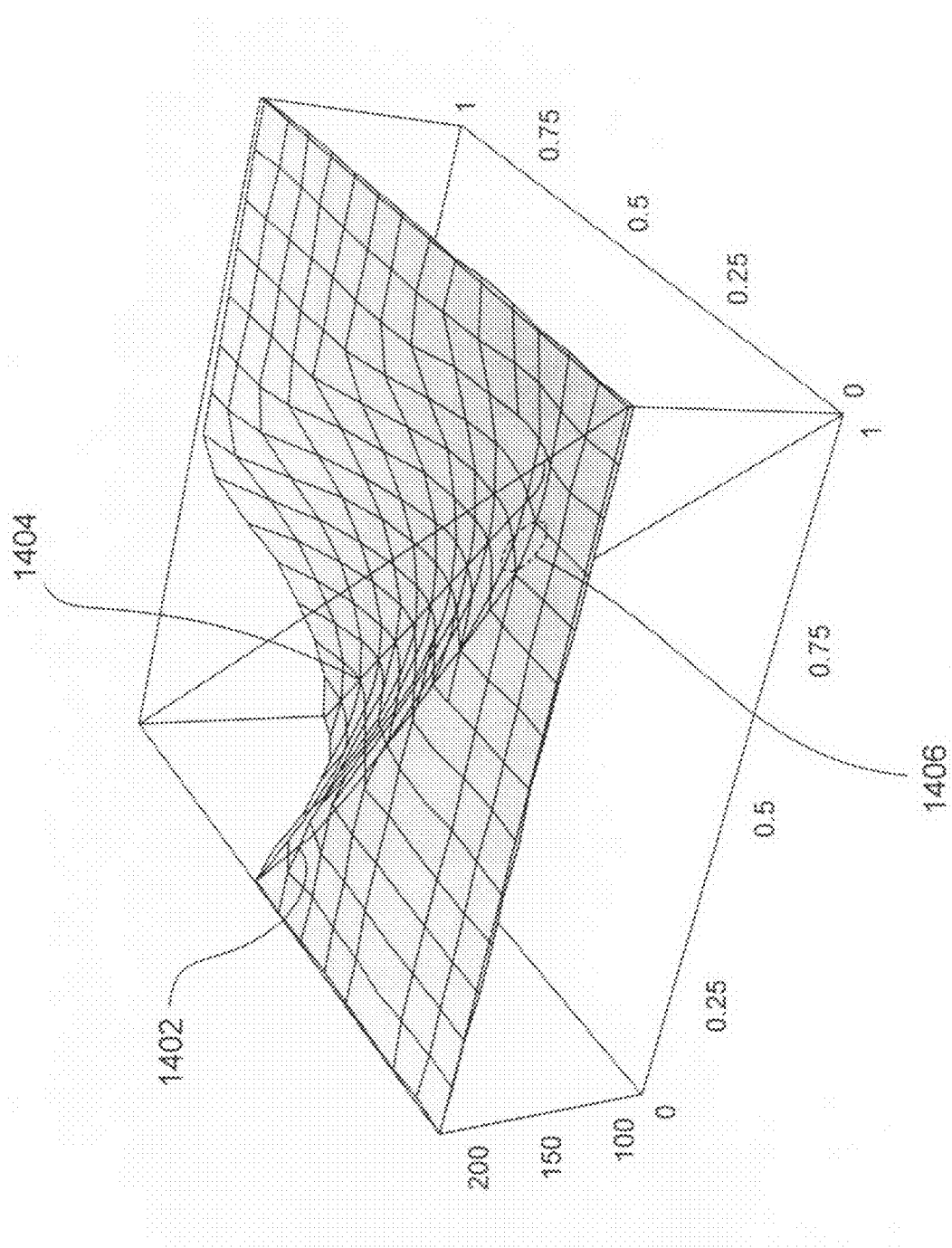
FIG. 14 illustrates the portion of the $f_1$, $f_2$ plane above which the risk values are below 220 for the plot of FIG. 13, according to one embodiment of the present invention.
Figure 15:
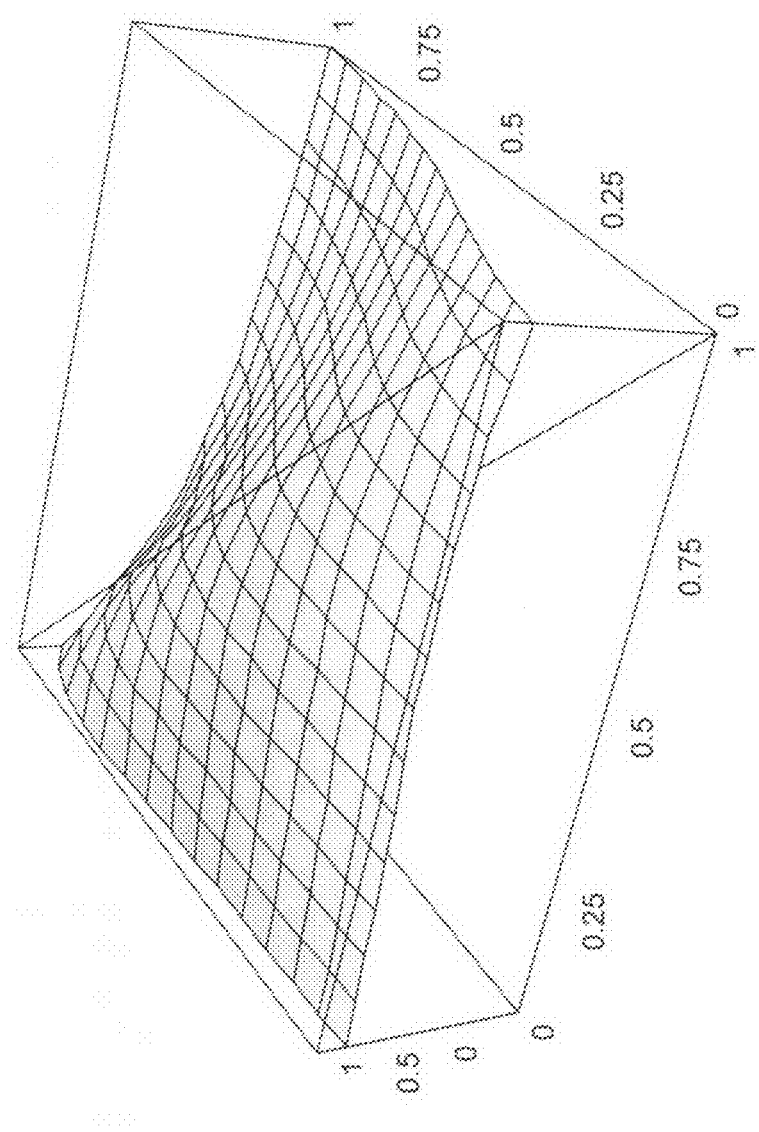
FIG. 15 shows a plot of a return/risk ratio computed over fractional display times $f_1$ and $f_2$ for the three k-partitions described by data shown in FIG. 11 according to embodiments of the present invention.

FIG. 13 shows a plot of computed risk versus fractional display times $f_1$ and $f_2$ for the three k-partitions described by data shown in FIG. 11 according to embodiments of the present invention. In FIG. 13, the relevant portion of the risk surface 1301 is that to the left of the diagonal plane 1303 $f_1=f_2$. As can be seen in FIG. 13, the risk is highest at point 1302, where $f_3=1.0$ and $f_1$ and $f_2$ both equal 0.0. Thus, the maximum rate of return is also associated with maximum risk. Consider the case that an Internet retailer wishes to schedule items for display such that the computed risk for the schedule is less than 220. FIG. 14 illustrates the portion of the $f_1, f_2$ plane above which the risk values are below 220 for the plot of FIG. 13, according to one embodiment of the present invention. FIG. 14 displays a plot of the function min (risk, 220). As shown in FIG. 14, suitable values for $f_1$ and $f_2$, for which the computed risk is at or below 220, fall between a curved line 1402 and a diagonal 1404 on the risk surface. Comparing FIG. 12 to FIG. 14, it is apparent that optimal $f_1$, $f_2$ values at which the rate of return is maximized and the risk is at or below 220 underlie the region shown by a dashed circle 1406 in FIG. 14. This region corresponds to a relatively large fraction of display time provided to items in partition $P_1$ and relatively short fractions of display time provided to items in partitions $P_2$ and $P_3$. Thus, the optimal solution for scheduling, in the above-discussed case, involves scheduling all three partitions, but favoring the partition $P_1$ with moderate rate of return and moderate variance, or risk. FIG. 15 shows a plot of a return/risk ratio computed over fractional display times $f_1$ and $f_2$ for the three k-partitions described by data shown in FIG. 11 according to embodiments of the present invention.

Although the described embodiment employs a fined value k, alternative embodiments may employ variable k values, where partitions may range in the number of included items depredating on the items included. In such cases, a more complex partition-selection method may be used to select not only a number of partitions, but also the number of items, and the identities of the number of items, for each partition.

Figure 16:
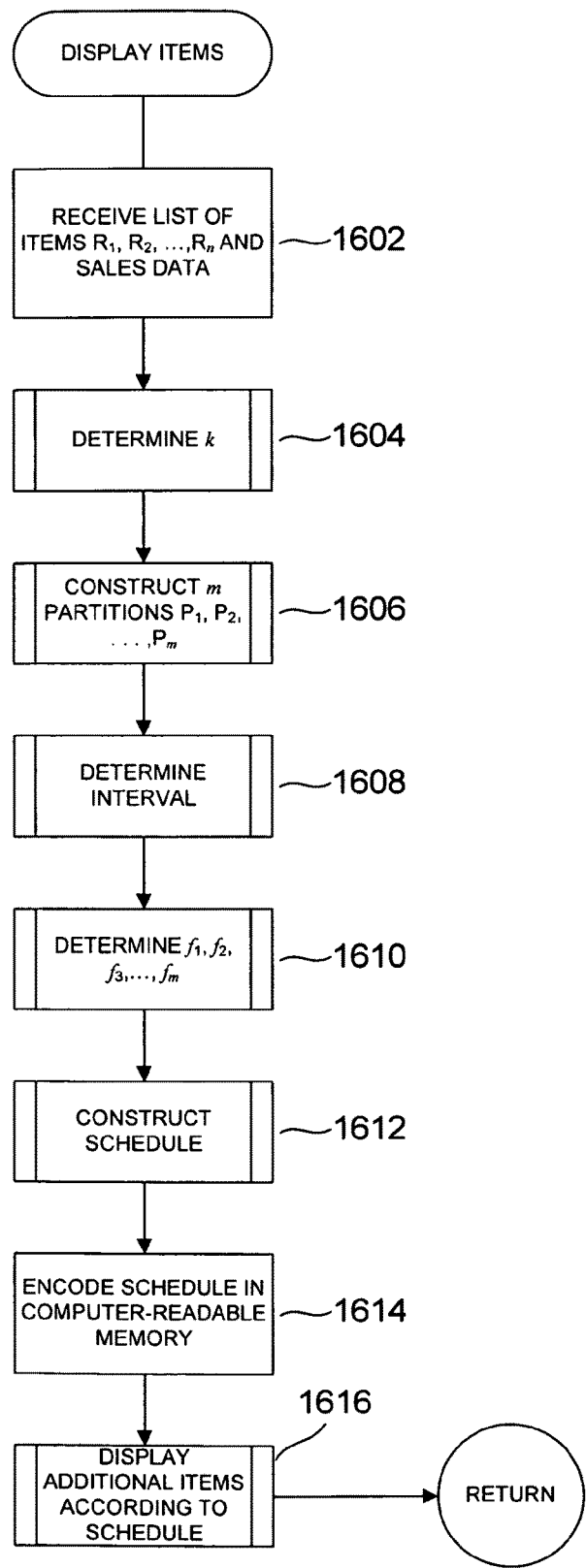
FIGS. 16-19 provide flow-control diagrams for one embodiment of the present invention.

FIGS. 16-19 provide flow-control diagrams for one embodiment of the present invention. FIG. 16 provides a control-flow diagram for the routine "display times," which selects candidate items for display, creates k-partitions from those candidates, and computes a schedule for display of the k-partitions. In step 1602, a list of candidate items for display, $R_1, R_2, \ldots R_n$, is obtained, along with historical sales or purchase data, such as the data shown in FIG. 6. In step 1604, the value k is determined. The value of k may be determined from historical marketing and sales efforts and/or from comprehensive testing of additional-item displays within web pages. Next, in step 1606, k-partitions, $P_1, P_2, \ldots, P_n$ are constructed, as discussed above with reference to FIG. 9. Then, in step 1608, the length of individual display intervals, or, in other words, a short, fixed period of time during which items within any particular k partition are displayed during some longer period of time, is determined. In certain cases, this interval may be extremely short, so that each version of a web page returned to a customer generally features additional displayed items selected from a different k partition. In other cases, the interval is longer, so that during the interval, all customers to whom a particular web page is returned within the interval all receive the same item display. Next, in step 1610, an optimization method is used to determine optional fractional display times for each of the m k-partitions. In step 1612, a schedule is constructed using the determined fractional display times. In step 1614, the schedule is stored in a computer-readable memory in order to control display of items within a web page according to the schedule, in step 1616.

Figure 17:
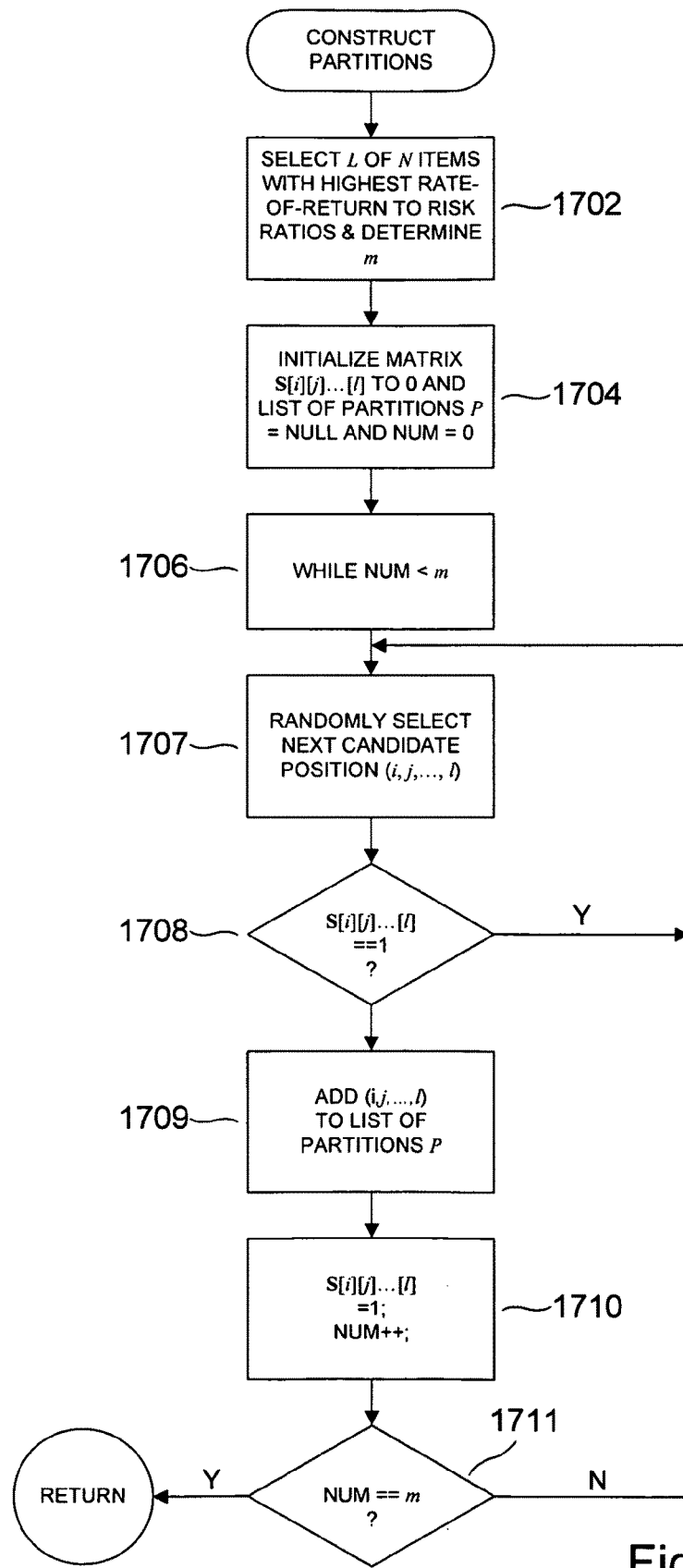

FIG. 17 provides a control-flow diagram for the partition-constructing routine called in step 1606 in FIG. 16. In an optional step 1602, some number L of the N candidate items for display received in step 1602 of FIG. 16 are selected based on a metric. One possible metric is the ratio of rate of return to risk. Also, in step 1702, the desired number of k-partitions, m, is determined. For small values of k, m may equal $$\binom{L}{k}.$$

In other cases, it may be some fraction of the total number of possible combinations of k-partitions. In step 1704, an l-dimensional matrix S of Boolean values is initialized to all "0" values and a list of partitions P is initialized to null. In addition, local variable num is initialized to 0. Then, in the while-loop of steps 1706-1711, additional candidate partitions are randomly selected until m partitions have been constructed. In step 1707, the next candidate partition is selected from some random k-index selection method. If this candidate partition has already been randomly selected, as determined in step 1708, then control flows back to step 1707. Otherwise, the randomly selected partition is added to the list of partitions, in step 1709, and the value in the S matrix corresponding to the candidate partition is set to 1, in step 1710. Also in step 1710, the local variable num is incremented.

Figure 18:
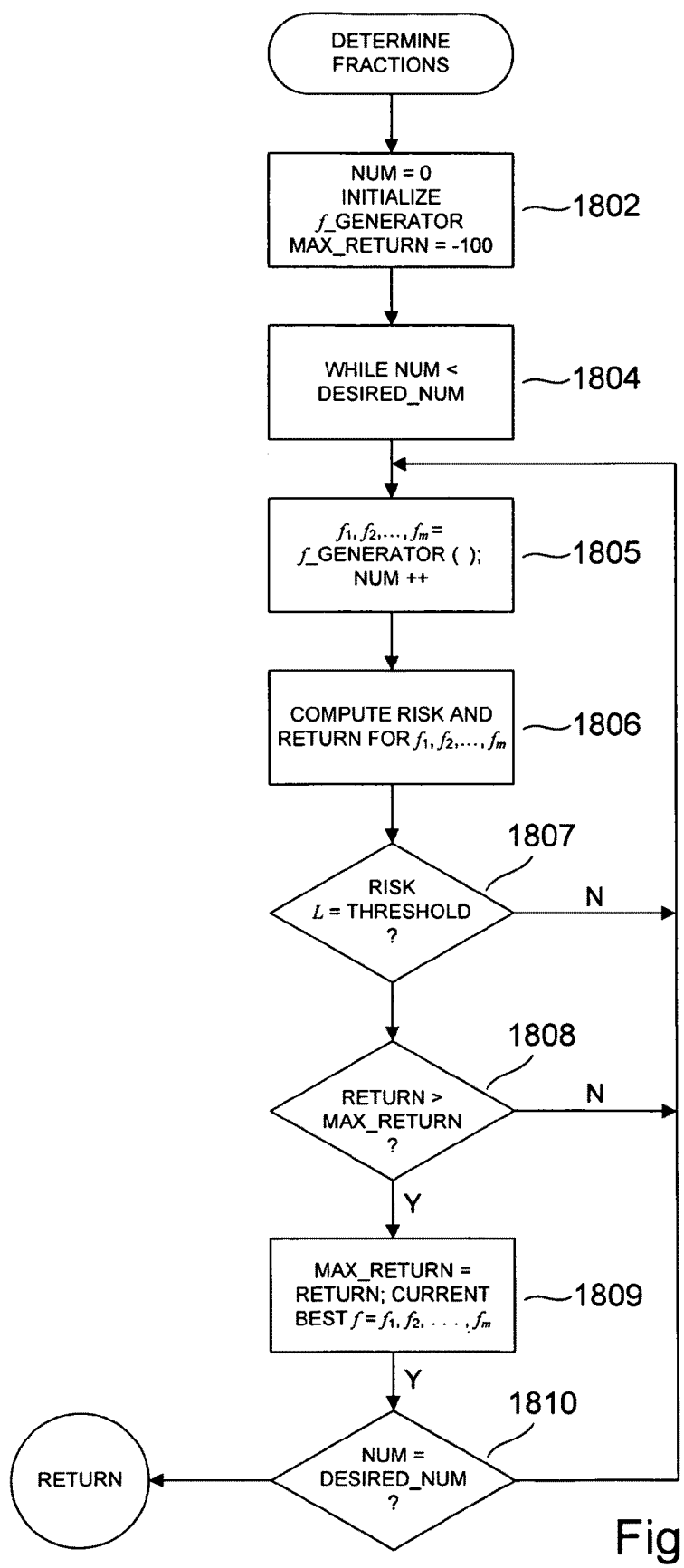

FIG. 18 shows a control-flow diagram for the fractional-time-display determining routine called in step 1610 of FIG. 16. In step 1802, local variable num is initialized to 0. Also in step 1802, a generator function f_generator that randomly generates a next set of fractional display time values $f_1, f_2, \ldots f_{m-1}$ is initialized. The local variable max_return is initialized to a large negative value. Then, in the while-loop of steps 1804-1810, a large number of different points in fractional-display-time space are evaluated in order to find an optimal set of fractional display times. The next point in fractional-display-time space is generated by a call to the function f_generator, in step 1805, and the local variable num is incremented. In step 1806, the risk and return for the currently considered set of fractional times is computed, as discussed above with reference to FIG. 10. If the computed risk is less than or equal to a risk threshold, as determined in step 1807, then, if the computed rate of return is greater than the current maximum rate of return, as determined in step 1808, the current point in fractional-display-time space is saved as the best set of fractional display times so far computed, and the local variable max_return is updated to contain the return value computed in step 1806.

Figure 19:
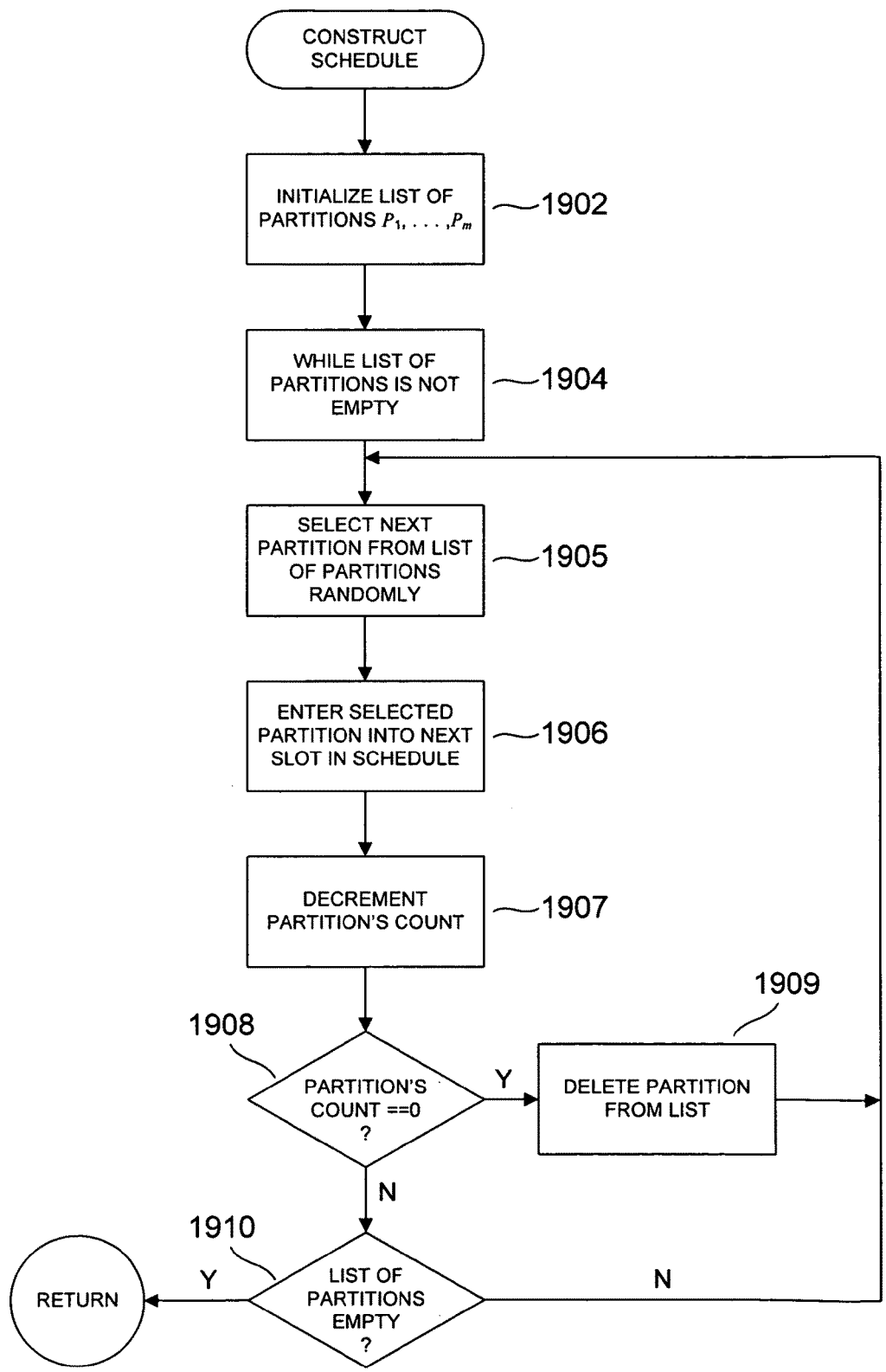

FIG. 19 provides a control-flow diagram for the routine "construct schedule" called in step 1612 of FIG. 16. In step 1902, a list of partitions $P_1, P_2, \ldots P_m$ is initialized so that each partition is allocated a number of time intervals corresponding to the optimal fraction of display time computed for that partition in step 1610 of FIG. 16, and a schedule data structure is initialized to be empty. Then, in the while-loop of steps 1904-1910, a next partition is randomly selected for display at a next time interval until the entire schedule is filled. In step 1905, a next partition is selected from the list of partitions by some random process. Next, in step 1906, the selected partition is entered into the next time slot within the schedule. The count of time intervals to which the partition may be subsequently assigned is decremented, in step 1907. If no additional time intervals remain for the partition, as determined in step 1908, then, in step 1909, the partition is deleted from the list of partitions. When the list of partitions is empty, and the scheduled filled, the routine finishes.

Although the present invention has been described in terms of particular embodiments, it is not intended that the invention be limited to these embodiments. Modifications within the spirit of the invention will be apparent to those skilled in the art. For example, method embodiments of the present invention may be alternatively developed by using various different programming languages, control structures, data structures, modular organization, and by varying any of many other programming parameters. Selection and scheduling of items available for purchase within a web page, or within some other form of advertising or information, is based on risk and rate of return. When the number of potential items for display is small, the partitioning of candidate items into k partition steps may be omitted, and fractional display times directly computed for the candidate items based on the risk and rate of returns estimated for each of the items, as well as the covariances or correlations between items, when available. In those cases where correlation coefficients or covariances are not available, computed variances may simply omit the covariance or correlation-coefficient-related terms. Correlations between k-partitions may be estimated by various means, including the percentage of items shared between two partitions, or may be determined from statistical analysis of data collected for various pairings of items in displayed advertisements. Risk and return can be defined for any of various types of information display. For example, rather than using sales or order data, a system may employ data collected with regard to website navigation, the number of click-throughs from one web page to additional web pages, number of requests for maps or directions to events, and many other types of data on which the above-mentioned statistical parameters can be calculated in order to determine risk/reward based schedules.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. An advertising system comprising:
  an advertising-selection-and-scheduling component that
    comprises computer instructions stored in a tangible computer-readable medium that are executed by a computer processor,
    selects advertising for inclusion in information provided to users,
    prepares a schedule for displaying the selected advertising based on estimation of return expected from including the selected advertising in the information provided to the users according to the schedule in relation to risk reflecting uncertainty in the estimation of return, and
    stores the prepared schedule in a computer-readable medium for subsequent access by the information-provision system; and
  an information-provision system that
    comprises computer instructions stored in a tangible computer-readable medium that are executed by a computer processor,
    accesses the stored schedule to select advertising for inclusion in the information, and
    provides the information, including advertising selected according to the schedule, to users for display.

2. The advertising system of claim 1 wherein the advertising selected and included in information prepared for provision to users is directed to one ore more of:
  products available for consideration and purchase by users;
  services available for consideration and purchase by users;
  information about events, and activities;
  information of general interest to users; and
  information of potential specific interest to a user.

3. The advertising system of claim 2 wherein the advertising selected and included in information prepared for provision to users includes one or more of:
  links on web pages to additional web pages describing items available for consideration and purchase by users;
  links on web pages to additional web pages containing information of general or specific interest to users, including information about events, activities, products, services, and opportunities;
  textual descriptions of the items available for consideration and purchase by users;
  textual encoding of information of general or specific interest to users, including information about events, activities, products, services, and opportunities;
  graphical images of the items available for consideration and purchase by users; and
  graphical images related to information of general or specific interest to users, including information about events, activities, products, services, and opportunities.

4. The advertising system of claim 2 wherein the advertising-selection-and-scheduling component of the information-provision system selects advertising for scheduling by one or more selection methods including:
  selecting information items related to the information in which advertising is to be inserted;
  selecting items available for purchase;
  randomly selecting a number of items from items available for purchase;
  randomly selecting a number of items from available information items;
  randomly selecting a number of items from items related to the information in which advertising for the items is to be inserted;
  selecting those items, from items available for purchase, for which a computed metric indicates the items to be most effectively advertised, the computed metric for an item computed from risk associated with advertising the item and expected return for advertising the item; and
  selecting those items, from items related to information in which advertising for the items is to be inserted, for which a computed metric indicates the items to be most effectively advertised, the computed metric for an item computed from risk associated with advertising the item and expected return for advertising the item.

5. The advertising system of claim 2 wherein the advertising-selection-and- scheduling component of the information-provision system prepares a schedule for inclusion of selected advertising in information prepared for provision to users by:
  when k items are to be advertised together in the information provided to the users, selecting a number m of k-partitions of the selected advertising directed to items;
  assigning a risk and an expected return to each k-partition;
  determining a display time for each k-partition that provides a specified, a near-optimal, or an optimal return and that provides a risk below a threshold risk; and
  assigning k-partitions to time periods within a total time interval according to the determined display times to create a schedule.

6. The advertising system of claim 5 wherein the risk assigned to a k-partition is related to a variance in sales or purchases of the k items in the k-partition computed from sales or purchase data.

7. The advertising system of claim 5 wherein the risk assigned to a k-partition is related to a variance in a rate of sales or rate of purchases of the k items in the k-partition computed from sales or purchase data.

8. The advertising system of claim 5 wherein the return expected for each k-partition is related to an average number of sales or purchases for the k items in the k-partition computed from sales or purchase data.

9. The advertising system of claim 5 wherein the return expected for each k-partition is related to an average rate of sales or purchases for the k items in the k-partition computed from sales or purchase data.

10. The advertising system of claim 5 wherein determining a display time for each k-partition further comprises applying an optimization method for optimizing the expected return for advertising each k-partition for the display time assigned to the k-partition under a constraint that the risk for advertising each k-partition for the display time assigned to the item falls below the threshold risk.

11. The advertising system of claim 10 wherein determining a display time for each k-partition further comprises evaluating, for each of a number of different display-time assignments to k-partitions, the expected return for advertising each k-partition for the display time assigned to the k-partition under the display-time assignment and the risk for advertising each k-partition for the display time assigned to the k-partition under the display-time assignment and selecting the display-time assignment that provides greatest expected return as a risk below the threshold risk.

12. The advertising system of claim 4 wherein assigning k-partitions to time periods within a total time interval according to the determined display times to create a schedule further comprises:
  iteratively
    randomly selecting a next k-partition with available display time,
    assigning the k-partition to a next time period, and
    decrementing the available display time for the randomly selected next k-partition until the time periods in the total time interval have been assigned k-partitions.

13. A method for advertising comprising:
  providing an information-provision system that prepares information for provision to users and an advertising-selection-and-scheduling component that both execute on a computer processor;
  selecting, by the advertising-selection-and-scheduling component, advertising for inclusion in the information provided to users,
  preparing a schedule for displaying the selected advertising based on estimation of return expected from including the selected advertising in the information provided to the users according to the schedule in relation to risk reflecting uncertainty in the estimation of return;
  storing the schedule in a computer-readable medium for subsequent access by the information-provision system;
  accessing, information-provision system, the stored schedule to select advertising for inclusion in the information provided to users, and providing the information, including advertising selected according to the schedule, to users for display.

14. The method of claim 13 wherein selecting, by the advertising component, advertising for inclusion in the information provided to users further includes:
  selecting information items related to the information in which advertising is to be inserted;
  selecting items available for purchase;
  randomly selecting a number of items from items available for purchase;
  randomly selecting a number of items from available information items;
  randomly selecting a number of items from items related to the information in which advertising for the items is to be inserted;
  selecting those items, from items available for purchase, for which a computed metric indicates the items to be most effectively advertised, the computed metric for an item computed from risk associated with advertising the item and expected return for advertising the item; and
  selecting those items, from items related to information in which advertising for the items is to be inserted, for which a computed metric indicates the items to be most effectively advertised, the computed metric for an item computed from risk associated with advertising the item and expected return for advertising the item.

15. The method of claim 13 wherein preparing a schedule for inclusion of selected advertising in the information prepared for provision to users based on risk associated with, and return expected from, including the selected advertising in the information provided to users further includes:
  when k items are to be advertised together in the information to users, selecting a number m of k-partitions of the selected advertising directed to items;
  assigning a risk and an expected return to each k-partition;
  determining a display time for each k-partition that provides a specified, a near-optimal, or an optimal return and that provides a risk below a threshold risk; and
  assigning k-partitions to time periods within a total time interval according to the determined display times to create a schedule.

16. A special-purpose computer system comprising:
  one or more processors;
  one or more electronic memories;
  one or more communications ports that interconnect the computer system with remote computers; and
  an advertising-selection-and-scheduling component that
    receives a list of candidate advertisements for display,
    constructs, in one or more of the one or more electronic memories, a number of k-partitions, each partition comprising k of the candidate advertisements,
    determines a display-interval length and stores the display-interval length in one or more of the one or more electronic memories,
    carries out a fractional-time-display optimization to select optimal fractional display times for each of the k-partitions based on estimation of return expected from display of the advertisements in the k-partitions in relation to risk reflecting uncertainty in the estimation of return, the optimal fractional display times constrained to provide the risk less than a threshold risk and the estimation of return greater than a threshold return, and
    constructs, in one or more of the one or more electronic memories, a schedule by allocating, for each k-partition, a number of display intervals corresponding to the optimal fractional display time for the k-partition and filing any remaining unfilled display times by random or pseudo-random allocation to k-partitions.

17. The special-purpose computer system of claim 16 wherein the advertising-selection-and-scheduling component additionally transmits the schedule to a remote computer upon receiving a request from the remote computer for the schedule.

18. The special-purpose computer system of claim 17 wherein the risk for a set of k-partition display times is estimated from a computed standard deviation for previously recorded sales of the k candidate advertisements and the return for a set of k-partition display times is estimated from a computed average for previously recorded sales of the k candidate advertisements.

* * * * *

UNITED STATES PATENT AND TRADEMARK OFFICE
CERTIFICATE OF CORRECTION

PATENT NO.        : 8,533,041 B2
APPLICATION NO.   : 12/286486
DATED             : September 10, 2013
INVENTOR(S)       : Bernardo Huberman et al.

It is certified that error appears in the above-identified patent and that said Letters Patent is hereby corrected as shown below:

In the Claims:

In column 13, line 57, in Claim 2, delete "ore" and insert -- or --, therefor.

In column 14, line 43, in Claim 5, delete "and- scheduling" and insert -- and-scheduling --, therefor.

Signed and Sealed this
Twentieth Day of May, 2014

Michelle K. Lee
*Deputy Director of the United States Patent and Trademark Office*